(12) United States Patent
Kawano

(10) Patent No.: US 7,359,541 B2
(45) Date of Patent: Apr. 15, 2008

(54) RADIATION IMAGE PROCESSING APPARATUS

(75) Inventor: Tsutomu Kawano, Tokyo (JP)

(73) Assignee: Konica Corporation, Tokyo (JP)

( * ) Notice: Subject to any disclaimer, the term of this patent is extended or adjusted under 35 U.S.C. 154(b) by 716 days.

(21) Appl. No.: 09/840,193

(22) Filed: Apr. 23, 2001

(65) Prior Publication Data
US 2002/0031246 A1    Mar. 14, 2002

(30) Foreign Application Priority Data

| Apr. 28, 2000 | (JP) | ............................. 2000/130220 |
| May 19, 2000 | (JP) | ............................. 2000/147970 |
| Oct. 31, 2000 | (JP) | ............................. 2000/332021 |
| Dec. 8, 2000 | (JP) | ............................. 2000/373788 |

(51) Int. Cl.
*G06K 9/00* (2006.01)

(52) U.S. Cl. ...................... 382/132; 382/190; 382/199; 382/266

(58) Field of Classification Search ................ 382/132, 382/190, 199, 166, 224, 266
See application file for complete search history.

(56) References Cited

U.S. PATENT DOCUMENTS

| 5,574,799 | A | * | 11/1996 | Bankman et al. ............ 382/132 |
| 5,732,149 | A | * | 3/1998 | Kido et al. .................. 382/128 |
| 5,825,910 | A | * | 10/1998 | Vafai .......................... 382/132 |
| 6,335,980 | B1 | * | 1/2002 | Armato et al. ............... 382/132 |
| 6,493,458 | B2 | * | 12/2002 | Yasui et al. .................. 382/104 |
| 6,594,380 | B2 | * | 7/2003 | Shinbata ....................... 382/132 |
| 6,625,303 | B1 | * | 9/2003 | Young et al. ................ 382/132 |
| 6,714,623 | B2 | * | 3/2004 | Sako et al. ................. 378/98.8 |

FOREIGN PATENT DOCUMENTS

| JP | 55-012429 | 1/1980 |
| JP | 63-189853 | 8/1988 |
| JP | 06-304159 | 11/1994 |
| JP | 06-304160 | 11/1994 |
| JP | 06-342098 | 12/1994 |
| JP | 09-090048 | 4/1997 |
| JP | 11-085950 | 3/1999 |
| JP | 11-096380 | 4/1999 |

OTHER PUBLICATIONS

Cios et al. "A Novel Algorithm for Classification of SPECT Images of a Human Heart", 1996, Ninth IEEE Symposium on Computer-Based Medical Systems.*

* cited by examiner

*Primary Examiner*—Brian Werner
*Assistant Examiner*—Shefali Goradia
(74) *Attorney, Agent, or Firm*—Frishauf, Holtz, Goodman & Chick, P.C.

(57) ABSTRACT

An image processing apparatus provided with an object region extracting means that detects an amount of radiation energy transmitted through an object and extracts an object region on which an object is radiographed for a radiation image corresponding to the amount of the detection and with a contour recognizing means that recognizes a contour based on the object region extracted by the object region extracting means wherein the contour recognizing means extracts a feature amount.

11 Claims, 15 Drawing Sheets

REDUCED (ORIGINAL) IMAGE

OBJECT REGION IMAGE

☐ : OBJECT REGION

● : REGION BOUNDARY POINT

◄► : REGION WIDTH n = 1 n = 2 n = 3 n = 4

EDGE DIRECTION

EDGE DIRECTION

"CONTINUOUS EDGES IN SAME DIRECTION" EXISTING AT SEPARATED POSITIONS

"CONTINUOUS EDGES IN SAME DIRECTION" AND "CONVERGENCE LINE OF NON-DIRECTIONAL EDGES" EXISTING TO CROSS AT RIGHT ANGLES

RADIATION IMAGE PROCESSING APPARATUS

BACKGROUND OF THE INVENTION

The present invention relates to a feature extracting method, a radiography object recognizing method and an image processing apparatus which are for processing a radiation image, and in particular, to a feature extracting method, a radiography object recognizing method and an image processing apparatus which are capable of extracting features necessary for optimum processing of a radiation image.

In recent years, there have been developed apparatuses capable of radiographing a radiation image directly as a digital image. For example, as an apparatus wherein an amount of radiations irradiated on a radiography object (subject) is detected, and radiation images formed in accordance with an amount of the detection are obtained as electrical signals, there have been disclosed many methods such as those disclosed in TOKKAISHO Nos. 55-12429 and 63-189853 employing a detector in which a stimulable phosphor is used.

In the apparatus stated above, radiations transmitted once through a radiography object are radiated on a detector in which stimulable phosphors are stuck to a sheet-like base board through coating or deposition, so that the radiations are absorbed in the stimulable phosphors.

After that, the stimulable phosphors are stimulated by light or heat energy, and thereby, radiation energy accumulated in the stimulable phosphors through the above-mentioned absorption is emitted as fluorescence light, so that the fluorescence light is subjected to photoelectric conversion to obtain image signals.

On the other hand, there has been proposed a radiation image detecting apparatus wherein electric charges corresponding to the intensity of radiated radiations are generated on a photoconductive layer, then, the generated charges are accumulated on a plurality of capacitors arranged two-dimensionally, and the accumulated charges are taken out to obtain.

The radiation image detecting apparatus of this type employs one called a flat panel detector (FPD). With regard to FDP of this type, there are known those realized by combination of A (a phosphor to emit fluorescence corresponding to the intensity of radiated radiations) and B (a photoelectric converting element such as a photodiode or CCD that receives fluorescence emitted from the phosphor directly or through a reduction optical system and conducts photoelectric conversion, as described in TOKKAIHEI No. 9-90048.

The same FDP is described also in TOKKAIHEI No. 6-342098, and there is also known one which directly converts radiated radiations into electric charges.

In these apparatuses, for the purpose of expressing radiation images with gradation that is appropriate for diagnoses, it is desirable to conduct gradation conversion automatically for images obtained on the apparatuses so that a portion to be looked by a doctor (a body part of interest, a region of interest) may be observed easily.

For the purpose of conducting this automatic gradation conversion, there is determined a processing condition such as a look-up table (LUT) wherein output signal values for input signal values are stipulated based on statistical features of image data (the greatest value, the smallest value and a histogram of the data), and thereby the gradation conversion is conducted for the entire image.

For the purpose of making the structure of details to be observed easily, there is also conducted an edge enhancement processing, and further a dynamic range compression processing for easy simultaneous observation of a high density portion and a low density portion, by highlighting edges and by narrowing a signal region of a radiography object.

However, in radiographing used for diagnoses, image processing conditions for obtaining optimum images for diagnoses vary depending on body parts radiographed, because a region to be looked by a doctor varies in radiographed body parts so as to cover many aspects from head to extremity. Further, in the same way, processing conditions also vary depending on the radiographing orientation (radiographing direction) in which the object is placed.

In these apparatuses, therefore, it has been necessary to input a body part radiographed on a radiography object and the radiographing orientation before conducting image processing so that optimum processing conditions may be selected.

Some hospitals are provided with a hospital information system (HIS) or a radiology section information system (RIS), wherein there are no operations of a radiologist in particular, and optimum processing conditions can be selected, because information of a radiographed body part can be obtained directly from order information for radiographing. In the majority of hospitals, however, these systems are not provided, and radiologists are required to input the information manually.

In the case of radiographing in a state of emergency, radiologists are sometimes required to input information of a body part on a radiography object manually even in the hospitals equipped with the above-mentioned HIS or RIS, because quick radiographing is required.

However, the number of kinds of radiographed body parts generally is 100 or more, and it is complicated to conduct the inputting operations stated above for each radiographing, which has been a burden for a radiographer who is in charge of radiographing.

For lightening the burden for the radiographer, therefore, it is required to read images obtained through radiographing to recognize a body part on a radiography object and the direction automatically, and to select the optimum processing conditions.

For judging the radiographed body part automatically, it is important to obtain precisely, from an image, a feature amount (features) that shows the radiographed body part on a radiography object.

As a method to extract a feature amount of a radiography object, there is one which extracts a feature amount from a position of a pixel showing the highest density value excluding a region of direct irradiation line irradiated directly by radiations and from a profile crossing the pixel, as that in TOKKAIHEI No. 11-96380, for example, and is used for judging whether the radiographed body part is a front side of the chest or a side of the chest.

However, the method described in the aforesaid open official gazette is persistently one for judging whether the body part is on the front side of the chest or on the side of the chest, and the method cannot be used for judgment of other body parts. Further, in radiographing used for diagnoses, it has been difficult to extract precisely a feature amount for recognizing accurately each body part radiographed, because body parts radiographed cover many aspects from head to extremity and a region to be looked by a doctor varies depending on each body part.

SUMMARY OF THE INVENTION

The invention has been attained, in view of the problems stated above and its first object is to realize a feature extracting method, a radiography object recognizing method and an image processing apparatus, wherein it is possible to extract a feature amount for recognizing accurately various body parts radiographed in a broad range from head to extremity, for radiation images.

As a method to judge the radiographing orientation automatically, there are disclosed, for example, TOKKAIHEI Nos. 6-304159, 6-304160 and 11-85950.

In these methods, judgment is made by local symmetric property and density distribution, based on image density.

If it is possible to extract information such as a contour (outline), skeleton and a lung contour of a radiography object in the radiographed body part, in judgment of radiographing orientation for the radiography object, it is extremely useful and a precision for judgment is improved. However, in the method based on density of an image as that disclosed in the aforesaid method, these useful information cannot be used effectively.

The second object of the invention is to provide a means to judge the direction of radiographing accurately for various body parts radiographed in a broad range covering from head to extremity, by utilizing information about contour and skeleton of a radiography object, for radiation images.

It is possible for the invention attaining the first object to specify the contour of a radiography object and thereby to recognize body parts for radiographing correctly for various body parts for radiographing in a broader range covering from head to limb bones, by extracting a positional change of a boundary of a object region and a change in width of the region after extracting the object region.

To be more concrete, the foregoing is shown in the following items (1)-(11). Incidentally, in the present specification, the contour of the object region is a form of a silhouette of a portion of the human body in a radiation image. The radiation image is an image obtained by converting each of amounts detected by an amount detecting means into a signal value.

(1) An image processing apparatus is provided with a object region extracting means that detects an amount of radiations transmitted through a radiography object and extracts an object region on which a radiography object is radiographed for a radiation image corresponding to the amount of the detection and with a contour recognizing means that examines a contour of the object region extracted by the object region extracting means and extracts a feature amount.

Further, an feature extracting method is provided with an object region extracting step that detects an amount of radiations transmitted through an object and extracts an object region on which a radiography object is radiographed for a radiation image corresponding to the amount of the detection and with a contour recognizing step that examines a contour of the object region extracted by the object region extracting step and extracts a feature amount.

In these inventions mentioned above, it is possible to extract a feature amount that is effective for recognizing body parts for radiographing, because an object region is extracted and the feature amount is extracted by examining a contour of the extracted object region.

(2) In the image processing apparatus described in Item (1), the contour recognizing means mentioned above uses a positional change of a boundary of the object region.

In the feature extracting method described in Item (1), the contour recognizing step stated uses a positional change of a boundary of the object region.

In these inventions mentioned above, it is possible to extract a feature amount that is more detailed, because an object region is extracted and a positional change of a boundary of the object region is examined when extracting a feature amount by examining a contour of the extracted object region.

(3) In the image processing apparatus described in Item (2), the contour recognizing means is provided with a region boundary detecting means that detects a boundary of the object region, a positional change amount calculating means that calculates a positional change amount of a boundary of the object region from plural region boundary points detected by the region boundary detecting means, and a contour specifying means that specifies a contour from the positional change amount calculated by the positional change amount calculating means, wherein the region boundary detecting means uses a plurality of different scanning lines that scan from one end to the other end of an image in succession, and extracts a target pixel positioned on each scanning line as a region boundary point when the target pixel is included in the object region and when a given pixel near the target pixel is not included in the object region, with regard to one or both of the horizontal and vertical directions of the image, the positional change amount calculating means obtains a positional change amount between all or given plural region boundary points and adjoining other region boundary points, and the contour specifying means specifies the contour from the plural positional change amounts by classifying them into plural patters prepared in advance.

Further, in the feature extracting method described in Item (2), the contour recognizing step is provided with a region boundary detecting step that detects a boundary of the object region, a positional change amount calculating step that calculates a positional change amount of a boundary of the object region from plural region boundary points detected by the region boundary detecting step, and with a form specifying step that specifies a contour from the positional change amount calculated by the positional change amount calculating step, wherein the region boundary detecting step uses a plurality of different scanning lines that scan from one end to the other end of an image in succession, and extracts a target pixel positioned on each scanning line as a region boundary point when the target pixel is included in the object region and when a given pixel near the target pixel is not included in the object region, with regard to one or both of the horizontal and vertical directions of the image, the positional change amount calculating step obtains a positional change amount between all or given plural region boundary points and adjoining other region boundary points, and the form specifying step specifies the contour from the plural positional change amounts by classifying them into plural patters prepared in advance.

In these inventions, when extracting an object region and thereby extracting a feature amount by examining a contour of the extracted object region, it is possible to extract a feature amount that is more detailed because the contour can be grasped correctly.

(4) In the image processing apparatus described in Item (3), the positional change amount is a distance between adjoining region boundary points.

Further, in the feature extracting method described in Item (3), the positional change amount is a distance between adjoining region boundary points.

In these inventions, when extracting an object region and thereby extracting a feature amount by examining a contour of the extracted object region, it is possible to extract a feature amount that is more detailed because the contour can be grasped correctly.

(5) In the image processing apparatus described in Item (3), the positional change amount represents an amount of change of a coordinate value in one or both of the horizontal direction and the vertical direction for adjoining region boundary points.

Further, in the feature extracting method described in Item (3), the positional change amount represents an amount of change of a coordinate value in one or both of the horizontal direction and the vertical direction for adjoining region boundary points.

In these inventions, when extracting an object region and thereby extracting a feature amount by examining a contour of the extracted object region, it is possible to extract a feature amount that is more detailed because the contour can be grasped correctly.

(6) In the image processing apparatus described in Item (1), the contour recognizing means uses a local width of the object region.

Further, in the feature extracting method described in Item (1), the contour recognizing step uses a local width of the object region.

In these inventions, when extracting an object region and thereby extracting a feature amount by examining a contour of the extracted object region, it is possible to extract a feature amount that is more detailed by examining a local width of the object region.

(7) In the image processing apparatus described in Item (6), the contour recognizing means is provided with a region boundary detecting means that detects a boundary of the object region, a region width calculating means that calculates a local width of the object region from plural region boundary points detected by the region boundary detecting means, and with a contour specifying means that specifies a contour from the region width calculated by the region width calculating means, wherein the region boundary detecting means uses a plurality of different scanning lines that scan from one end to the other end of an image in succession, and extracts a target pixel positioned on each scanning line as a region boundary point when the target pixel is included in the object region and when a given pixel near the target pixel is not included in the object region, with regard to one or both of the horizontal and vertical directions of the image, the region width calculating means calculates a distance between region boundary points in plural region boundary points on the same scanning line among the region boundary points for each of the plural scanning lines, and the contour specifying means specifies the contour from the region width for each of the plural scanning lines by classifying into plural patters prepared in advance.

Further, in the feature extracting method described in Item (6), the contour recognizing step is provided with a region boundary detecting step that detects a boundary of the object region, a region width calculating step that calculates a local width of the object region from plural region boundary points detected by the region boundary detecting step, and with a form specifying step that specifies a contour from the region width calculated by the region width calculating step, wherein the region boundary detecting step uses a plurality of different scanning lines that scan from one end to the other end of an image in succession, and extracts a target pixel positioned on each scanning line as a region boundary point when the target pixel is included in the object region and when a given pixel near the target pixel is not included in the object region, with regard to one or both of the horizontal and vertical directions of the image, the region width calculating step calculates a distance between region boundary points in plural region boundary points on the same scanning line among the region boundary points for each of the plural scanning lines, and the form specifying step specifies the contour from the region width for each of the plural scanning lines by classifying into plural patters prepared in advance.

In these inventions, when extracting an object region and thereby extracting a feature amount by examining a contour of the extracted object region, it is possible to extract a feature amount that is more detailed because a local region width can be grasped correctly.

(8) In he image processing apparatus described in either one of Items (1)-(7), a body part or a posture of a radiography object in a radiation image is recognized by using a feature amount obtained in the contour recognizing means stated above.

Further, in a radiography object recognizing method, a body part or a posture of a radiography object in a radiation image is recognized by using a feature amount obtained by a feature extracting method in either one of Items (1)-(7).

In these inventions, it is possible to recognize a body part and a posture of a radiography object in a radiation image correctly by using a feature amount based on the contour.

(9) An image processing apparatus has therein an object region extracting means that detects an amount of radiations transmitted through a radiography object and extracts an object region where the radiography object is radiographed, for the radiation image corresponding to the detected amount of radiations and an object region edge examining means that examines the degree of contact between a contour of the object region extracted by the object region extracting means and an image edge or a radiation field edge, and extracts a feature amount based on the degree of contact.

Further, a feature extracting method has therein an object region extracting step that detects an amount of radiations transmitted through a radiography object and extracts an object region where the radiography object is radiographed, for the radiation image corresponding to the detected amount of radiations and an object region edge examining step that examines the degree of contact between a contour of the object region extracted by the object region extracting step and an image edge or a radiation field edge, and extracts a feature amount based on the degree of contact.

In these inventions, it is possible to extract a feature amount which is effective for recognizing a body part radiographed, because a degree of contact between a contour and an image edge or a radiation field edge, and a feature amount is extracted based on the degree of contact.

(10) In the image processing apparatus described in Item (9), a body part or a posture of a radiography object in a radiation image is recognized by using a feature amount obtained by the object region edge examining means.

Further, in a radiography object recognizing method, a body part or a posture of a radiography object in a radiation image is recognized by using a feature amount obtained by the feature extracting method in Item (9).

In these inventions, it is possible to recognize correctly a body part and a posture of a radiography object in a radiation image by using a feature amount based on the degree of contact between the contour and an image edge or a radiation field edge.

(11) In an image processing apparatus, a feature amount obtained by a contour recognizing means of the image processing apparatus in either one of the Items (1)-(7) and a feature amount obtained by the object region edge examining means in Item (9) are used to recognize a body part or a posture of a radiography object in a radiation image.

In a radiography object recognizing method, a feature amount obtained by the feature extracting method in either one of the Items (1)-(7) and a feature amount obtained by the feature extracting method in Item (9) are used to recognize a body part or a posture of the radiography object in a radiation image.

In these inventions, it is possible to recognize more correctly a body part and a posture of a radiography object in a radiation image by utilizing (using jointly) two types of feature amounts including a feature amount based on the contour and a feature amount based on the degree of contact between the contour and an image edge or between a contour and a radiation field edge.

The invention attaining the first object is an extracting method for a feature amount that is for recognizing automatically a radiographed body part of a radiography object in radiographing, wherein the state of distribution of signal variance in the object region is examined after the object region is extracted, and a distinctive pattern is detected. By extracting the detected pattern as a feature amount, and by using the feature amount, a radiographed body part and a posture of the radiography object can be recognized correctly.

To be more concrete, the foregoing is shown in the following items (12)-(18).

(12) An image processing apparatus has therein a signal variance extracting means that detects an amount of radiations transmitted through a radiography object and detects a signal variance between a given pixel on a radiation image corresponding to an amount of the detection and its neighboring pixel, a pattern detecting means that detects one or plural patterns from spatial distribution and intensity distribution of the signal variance obtained by the signal variance extracting means, and a feature amount extracting means that extracts a feature amount based on the pattern detected by the pattern detecting means.

A feature extracting method has therein a signal variance extracting step that detects an amount of radiations transmitted through a radiography object and detects a signal variance between a given pixel on a radiation image corresponding to an amount of the detection and its neighboring pixel, a pattern detecting step that detects one or plural patterns from spatial distribution and intensity distribution of the signal variance obtained by the signal variance extracting means, and a feature amount extracting means that extracts a feature amount based on the pattern detected by the pattern detecting step.

In these inventions, it is possible to extract a feature amount that is effective for recognizing a radiographed body part.

(13) An image processing apparatus has therein an object region extracting means that detects an amount of radiations transmitted through a radiography object and extracts the object region where the radiography object is radiographed for the radiation image corresponding to an amount of the detection, a signal variance extracting means that detects a signal variance between a given pixel included in the object region extracted by the object region extracting means and its neighboring pixel, a pattern detecting means that detects one of plural patterns from spatial distribution and intensity distribution of the signal variance obtained by the signal variance extracting means, and a feature amount extracting means that extracts a feature amount based on the pattern detected by the pattern detecting means.

A feature extracting method has therein an object region extracting step that detects an amount of radiations transmitted through a radiography object and extracts the object region where the radiography object is radiographed for the radiation image corresponding to an amount of the detection, a signal variance extracting step that detects a signal variance between a given pixel included in the object region extracted by the object region extracting step and its neighboring pixel, a pattern detecting step that detects one of plural patterns from spatial distribution and intensity distribution of the signal variance obtained by the signal variance extracting step, and a feature amount extracting step that extracts a feature amount based on the pattern detected by the pattern detecting step.

In these inventions, by examining only a signal variance in an object region, it is possible to extract a feature amount which is more accurate, without being carried away by useless information outside a radiation field.

(14) In the image processing apparatus described in either one of Items (12) and (13), the signal variance extracting means extracts an amount of change based on the primary differentiated value between neighboring pixels.

In the feature extracting method described in either one of Items (12) and (13), the signal variance extracting step extracts an amount of change based on the primary differentiated value between neighboring pixels.

In these inventions, it is possible to grasp a local signal variance accurately by using a primary differentiated value for a signal variance amount, and thereby to extract a feature amount that is more accurate.

(15) In the image processing apparatus described in either one of Items (12) and (13), the signal variance extracting means extracts a change amount based on a secondary differentiated value between neighboring pixels.

In the feature extracting method described in either one of Items (12) and (13), the signal variance extracting step extracts a change amount based on a secondary differentiated value between neighboring pixels.

In these inventions, it is possible to grasp a local signal variance accurately by using a secondary differentiated value for a signal variance amount, and thereby to extract a feature amount that is more accurate.

(16) In the image processing apparatus described in either one of Items (12)-(15), the pattern detecting means divides the radiation image in plural regions, and there is totaled the number of pixels each having the similar spatial inclination direction of the signal variance for pixels each having the prescribed amount or more of the signal variance amount between neighboring pixels obtained by the signal variance extracting means existing in each divided region, and a pattern is detected based on the results of the total.

In the feature attracting method described in either one of Items (12)-(15), the pattern detecting step divides the radiation image in plural regions, and there is totaled the number of pixels each having the similar spatial inclination direction of the signal variance, for pixels each being in each divided region and having the prescribed amount or more of the signal variance amount between neighboring pixels obtained by the signal variance extracting means, and a pattern is detected based on the results of the totalization.

In these inventions, only pixels each having the prescribed size or more in terms of a signal variance amount are counted locally, considering the direction of the signal variance, and by using the results of the counting, it is possible to detect the characterized pattern included in the radiation image and thereby to extract the feature amount that is more accurate.

(17) In the image processing apparatus described in either one of Items (12)-(15), the pattern detecting means detects a succession of the pixels as a pattern when the prescribed number or more of the pixels whose signal variance amount between neighboring pixels obtained by the signal variance extracting means is not less than the prescribed value and the spatial inclination direction of the signal variance is mostly the same are continuous in the same direction.

In the feature extracting method described in either one of Items 12-15, the pattern detecting step detects a succession of the pixels as a pattern when the prescribed number or more of the pixels whose signal variance amount between neighboring pixels obtained by the signal variance extracting step is not less than the prescribed value and the spatial inclination direction of the signal variance is mostly the same are continuous in the same direction.

In these inventions, it is possible to detect the characterized pattern included in the radiation image and thereby to extract the feature amount that is more accurate by examining continuity of pixels whose signal variance amount between neighboring pixels is not less than a prescribed size and their signal variance directions are mostly the same.

(18) In an image processing apparatus, a body part or a radiographing orientation of a radiography object in a radiation image is recognized by using a feature amount obtained by the feature extracting method described in either one of Items (12)-(17).

Further, a radiography object recognizing method recognizes a body part or a radiographing orientation of a radiography object in a radiation image by using a feature amount obtained by the feature extracting method described in either one of Items (12)-(17).

In these inventions, it is possible to recognize a body part or a posture of a radiography object in a radiation image by using a feature amount based on the signal variance.

In the invention to attain the first object, a precision of recognizing a body part and a direction of a radiography object can be improved through the combination of a feature amount belonging to a certain category and a feature amount belonging to another category in extraction of the feature amount that is necessary for recognizing a radiographed body part and direction of a radiography object in radiographing, wherein one or both feature amounts are regarded to be detected erroneously when the combination is impossible.

To be more concrete, the foregoing is shown in the following items (19)-(23).

(19) An image processing apparatus has therein a plurality of feature extracting means each detecting an amount of radiations transmitted through a radiography object and extracting a feature amount to be used for specifying a radiographed body part or direction of the radiography object for the radiation image corresponding to the amount of the detection of the amount, and a feature amount right or wrong judging means that judges right or wrong of the feature amount by the combination of plural feature amounts obtained by the plural feature extracting means.

Further, a feature amount right or wrong judging method has therein a plurality of feature extracting steps each detecting an amount of radiations transmitted through a radiography object and extracting a feature amount to be used for specifying a radiographed body part or direction of the radiography object for the radiation image corresponding to the amount of the detection of the amount, and a feature amount right or wrong judging step that judges true or false of the feature amount by the combination of plural feature amounts obtained by the plural feature extracting steps.

In these inventions, a feature amount to be used for specifying radiographed body part or direction of a radiography object for a radiation image is extracted by each of a plurality of feature extracting steps, and right and wrong judgment of the feature amount is conducted in the feature amount right and wrong judging step by the combination of plural feature amounts obtained by the plural feature extracting steps.

Thus, it is possible to recognize the radiographed body part or the radiographed direction accurately by conducting right and wrong judgment for features in a way of combination of a plurality of feature amounts.

(20) In the image processing apparatus described in Item (19), the image processing apparatus has an object region extracting means which detects an amount of radiations transmitted through a radiography object and extracts the object region where the radiography object is radiographed for a radiation image corresponding to the amount of the detection of the amount, and extracts plural feature amounts from the object region extracted by the object region extracting means.

Further, in the feature amount right and wrong judging method described in Item (19), the feature amount right and wrong judging method has an object region extracting step which detects an amount of radiations transmitted through a radiography object and extracts the object region where the radiography object is radiographed for a radiation image corresponding to the amount of the detection of the amount, and extracts plural feature amounts from the object region extracted by the object region extracting step.

In these inventions, there is provided the object region extracting step that extracts an object region where the radiography object is radiographed for a radiation image, and plural feature amounts are extracted from the object region extracted by the object region extracting step.

By examining a feature amount after extracting only an object region from images as stated above, it is possible to recognize a radiographed body part or the direction more accurately, without being carried away by useless signals outside a radiation field.

(21) In the image processing apparatus described in Item (20), the aforesaid plural feature extracting means has therein an edge feature amount extracting means that extracts a feature amount from a signal variance with its neighboring element in regard to a given pixel included in the object region extracted by the object region extracting means mentioned above, and a contour feature amount extracting means that extracts a feature amount from the shape of a contour of the object region extracted by the object region extracting means.

Further, in the feature amount right and wrong judging method described in Item (20), the plural feature amount extracting step has therein an edge feature amount extracting step that extracts a feature amount from a signal variance with its neighboring element in regard to a given pixel included in the object region extracted by the object region extracting step mentioned above, and a contour feature amount extracting step that extracts a feature amount from the shape of a contour of the object region extracted by the object region extracting step.

In these inventions, the plural feature amount extracting step extracts a feature amount from a signal variance with its neighboring element in regard to a given pixel included in the object region extracted by the object region extracting step mentioned above, and extracts a feature amount from a contour feature amount extracting step that extracts a feature amount from the shape of a contour of the object region extracted.

When right and wrong judgment is made with a combination of a contour of the radiography object and an edge pattern both serving as a feature amount as stated above, a contour of the radiography object does not conflict with the results of examination of internal structures, and a radiographed body part or direction can be recognized accurately.

(22) In the image processing apparatus described in Item (21), the edge feature amount extracting means has therein an edge detecting means that detects the pixel in which a signal variance amount with its neighboring pixel satisfies the prescribed condition, in regard to a given pixel included in the object region extracted by the object region extracting means mentioned above, and an edge pattern detecting means that extracts a feature amount of the radiography object based on spatial distribution of the pixel extracted by the edge detecting means.

Further, in the feature amount right and wrong judging method described in Item (21), the edge feature amount extracting step has therein an edge detecting step that detects the pixel in which a signal variance amount with its neighboring pixel satisfies the prescribed condition, in regard to a given pixel included in the object region extracted by the object region extracting step mentioned above, and an edge pattern detecting step that extracts a feature amount of the radiography object based on spatial distribution of the pixel extracted by the edge detecting step.

In these inventions, the edge feature amount extracting step extracts the pixel in which a signal variance amount with its neighboring pixel satisfies the prescribed condition, in regard to a given pixel included in the object region extracted by the object region extracting step mentioned above, and a feature amount of the radiography object is extracted based on spatial distribution of the pixel extracted.

By extracting the feature amount that indicates the feature of the radiography object properly from the edge pattern, it is possible to improve accuracy of right and wrong judgment made by combination with another feature amount.

(23) In the image processing apparatus described in Item (21), the contour feature amount extracting means has therein a region boundary detecting means that detects a boundary of the object region, a positional change amount calculating means that calculates a positional change amount of the boundary of the object region from plural boundary points detected by the region boundary detecting means, and a contour specifying means that specifies a contour from the positional change amount calculated by the positional change amount calculating means, and the region boundary detecting means detects a target pixel as a region boundary point when the target pixel is included in the object region and a given pixel near the target pixel is not in the object region, in regard to a certain pixel on each scanning line, by using plural different scanning lines which scan an image from its one end to the other end in succession in one or both of the horizontal direction and the vertical direction, the positional change amount calculating means obtains an amount of positional change from an adjoining other region boundary point with respect to all or optional plural region boundary points, and the contour specifying means specifies a contour by classifying into the plural patterns prepared in advance from the plural positional change amounts.

Further, in the feature amount right and wrong judging method described in Item (21), the contour feature amount extracting step has therein a region boundary detecting step that detects a boundary of the object region, a positional change amount calculating step that calculates a positional change amount of the boundary of the object region from plural boundary points detected by the region boundary detecting step, and a form specifying step that specifies a contour from the positional change amount calculated by the positional change amount calculating step, and the region boundary detecting step detects a target pixel as a region boundary point when the target pixel is included in the object region and a given pixel near the target pixel is not included in the object region, in regard to a certain pixel on each scanning line, by using plural different scanning lines which scan an image from its one end to the other end in succession in one or both of the horizontal direction and the vertical direction, the positional change amount calculating step obtains an amount of positional change from an adjoining other region boundary point with respect to all or optional plural region boundary points, and the form specifying step specifies a contour by classifying into the plural patterns prepared in advance from the plural positional change amounts.

In these inventions, the contour feature amount extracting step detects a target pixel as a region boundary point when the target pixel is included in the object region and a given pixel near the target pixel is not included in the object region, in regard to a certain pixel on each scanning line, by using plural different scanning lines which scan an image from its one end to the other end in succession in one or both of the horizontal direction and the vertical direction, and obtains an amount of positional change from an adjoining other region boundary point with respect to all or optional plural region boundary points to specify a contour by classifying into the plural patterns prepared in advance from the plural positional change amounts.

By extracting a feature amount that shows a feature of a radiography object more properly from a contour of the radiography object as in the foregoing, it is possible to improve a precision for right and wrong judgment by combining the above-mentioned feature amount with other feature amounts.

Next, the following structures are for attaining the second object of the invention.

(24) A radiographing orientation judging apparatus has therein an object region extracting means that detects an amount of radiations transmitted through a radiography object and extracts an object region where the radiography object is radiographed, for a radiation image that corresponds to the amount of the detection, a contour recognizing means that recognizes a contour of the object region extracted by the object region extracting means, and a radiographing orientation judging means that judges the radiographing orientation for a radiography object based on the contour obtained by the contour recognizing means.

A radiographing orientation judging method is characterized in that an amount of radiations transmitted through a radiography object is detected, then, an object region where the radiography object is radiographed for the radiation image corresponding to the amount of the detection is extracted by an object region extracting means, and the radiographing orientation for the radiography object is judged by a radiographing orientation judging means based on the contour obtained by a contour recognizing means that recognizes a contour of the extracted object region.

The invention in Item (24) makes it possible to judge the radiographing orientation accurately by using a contour of a radiography object.

(25) A radiographing orientation judging apparatus has therein an object region extracting means that detects an amount of radiations transmitted through a radiography object and extracts an object region where the radiography object is radiographed, for a radiation image that corresponds to the amount of the detection, a signal variance extracting means that extracts a pixel satisfying prescribed conditions for an optional pixel included in the object region extracted by the object region extracting means based on the signal variance from its neighboring pixel, and a radiographing orientation judging means that judges the radiographing orientation for a radiography object based on spatial distribution of the pixel extracted by the signal variance extracting means.

A radiographing orientation judging method is characterized in that an amount of radiations transmitted through a radiography object is detected, then, an object region where the radiography object is radiographed for the radiation image corresponding to the amount of the detection is extracted by an object region extracting means, then, the pixel satisfying prescribed conditions is extracted by the signal variance extracting means with regard to an optional pixel included in the extracted object region based on the signal variance from its neighboring pixel, and the radiographing orientation for the radiography object is judged by a radiographing orientation judging means based on spatial distribution of the pixel extracted by the signal variance extracting means.

The invention in Item (25) makes it possible to judge the radiographing orientation accurately because it is possible to grasp edges of a bone portion and a soft portion included in a radiography object by examining spatial distribution of the pixels wherein a signal variance between neighboring pixels satisfies prescribed conditions.

(26) A radiographing orientation judging apparatus has therein an object region extracting means that detects an amount of radiations transmitted through a radiography object and extracts an object region where the radiography object is radiographed, for a radiation image that corresponds to the amount of the detection, a contour recognizing means that recognizes a contour of the object region extracted by the object region extracting means, a signal variance extracting means that extracts a pixel satisfying prescribed conditions based on a signal variance between neighboring pixels for an optional pixel included in the object region extracted by the object region extracting means and a radiographing orientation judging means that judges the radiographing orientation for a radiography object based on the contour information obtained by the contour recognizing means and spatial distribution of the pixel extracted by the signal variance extracting means.

A radiographing orientation judging method is characterized in that an amount of radiations transmitted through a radiography object is detected, an object region where the radiography object is radiographed for the radiation image corresponding to the amount of the detection is extracted by an object region extracting means, a contour of the extracted object region is recognized by a contour recognizing means, then a pixel satisfying prescribed conditions based on signal variance from the neighboring pixel is extracted by a signal variance extracting means with regard to an optional pixel included in the object region, and the radiographing orientation for the radiography object is judged by a radiographing orientation judging means based on the contour obtained by the contour recognizing means and on spatial distribution of the pixel extracted by the signal variance extracting means.

The invention in Item (26) makes it possible to recognize the radiographing orientation more accurately by examining both of a contour of the radiography object and spatial distribution of the pixel wherein a signal variance satisfies prescribed conditions.

(27) In the radiographing orientation judging apparatus described in Item (26), the radiographing orientation judging means judges that the radiographing orientation is a transverse direction for a radiography object when the radiography object is judged to be radiographed in the transverse direction based on either one or both of the results of judgment from the contour information and the results of judgment from the spatial distribution.

In the radiographing orientation judging method described in Item (26), the radiographing orientation judging means judges that the radiographing orientation is a transverse direction for a radiography object when the radiography object is judged to be radiographed in the transverse direction based on either one or both of the results of judgment from the contour and the results of judgment from the spatial distribution.

The invention in Item (27) makes it possible to recognize the radiographing orientation more accurately by judging that a radiography object is radiographed in the transverse direction when there are examined the contour of the radiography object and the spatial distribution of the pixels wherein a signal variance satisfies prescribed conditions, and when the radiographing orientation is judged to be the transverse direction based on either one or both of the examined contour and the spatial distribution.

(28) In the radiographing orientation judging apparatus described in Item (26), the radiographing orientation judging means judges that the radiographing orientation is a transverse direction for a radiography object when the radiography object is judged to be radiographed in the transverse direction based on both of the results of judgment from the contour information and the results of judgment from the spatial distribution.

In the radiographing orientation judging method described in Item (26), the radiographing orientation judging means judges that the radiographing orientation is a transverse direction for a radiography object when the radiography object is judged to be radiographed in the transverse direction based on both of the results of judgment from the contour and the results of judgment from the spatial distribution.

The invention in Item (28) makes it possible to recognize the radiographing orientation more accurately by judging that a radiography object is radiographed in the transverse direction when there are examined the contour of the radiography object and the spatial distribution of the pixels wherein a signal variance satisfies prescribed conditions, and when the radiographing orientation is judged to be the transverse direction based on both of the examined contour and the spatial distribution.

(29) In the radiographing orientation judging apparatus described in Item (24) or Items (26)-(28), the contour recognizing means recognizes a portion where a boundary between the object region and the outside of the object region changes to be concave or convex.

In the radiographing orientation judging method described in Item (24) or Items (26)-(28), the contour recognizing means recognizes a portion where a boundary between the object region and the outside of the object region changes to be concave or convex.

The invention in Item (29) makes it possible to grasp a contour of a radiography object easily and thereby to judge the radiographing orientation more accurately, when the contour recognizing means recognizes a portion where a boundary between the object region and the outside of the object region changes to be concave or convex.

(30) In the radiographing orientation judging apparatus described in Items (25)-(28), the signal variance extracting means calculates an amount of signal variance between neighboring pixels through the secondary differential, with regard to an optional pixel within an object region, and extracts pixels amounting to 5-40% of the total number of pixels included in the object region in the order wherein the greatest absolute value of the signal variance amount comes first.

In the radiographing orientation judging method described in Items (25)-(28), the signal variance extracting means calculates an amount of signal variance between neighboring pixels through the secondary differential, with regard to an optional pixel within an object region, and extracts pixels amounting to 5-40% of the total number of pixels included in the object region in the order wherein the greatest absolute value of the signal variance amount comes first.

In the invention in Item (30), the signal variance extracting means evaluates the signal variance between neighboring pixels within an object region through the secondary differential value, and extracts only pixels having a large signal value, which makes it possible to grasp the structure in the radiography object easily and thereby to recognize the radiographing orientation accurately.

Incidentally, the "prescribed condition" mentioned in Items (25) and (26) means a pixel wherein a differential signal value obtained through primary or secondary differential operation between neighboring pixels, for example, has a value that is greater than the threshold value determined in advance, namely, it means a condition considered to carry edge information.

Each of FIGS. 3(a)-3(d) is an illustration showing how an object region is extracted in an example of an embodiment of the invention.

Figure 4A:
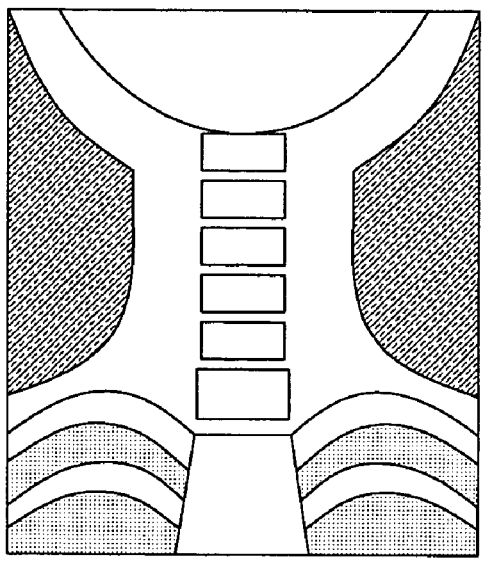
Figure 4B:
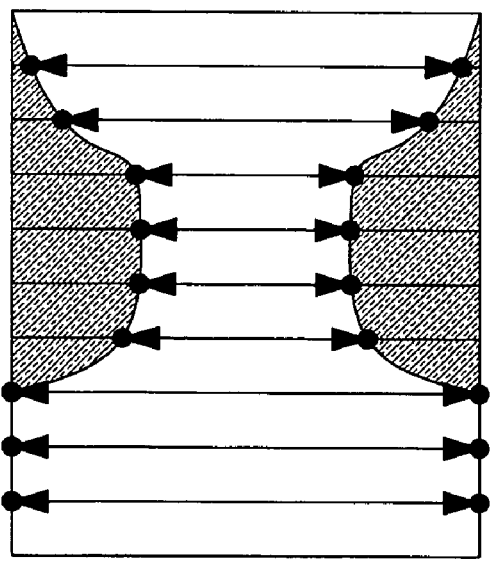

Each of FIGS. 4(a) and 4(b) is an illustration showing how a contour is recognized in an example of an embodiment of the invention.

Figure 5:
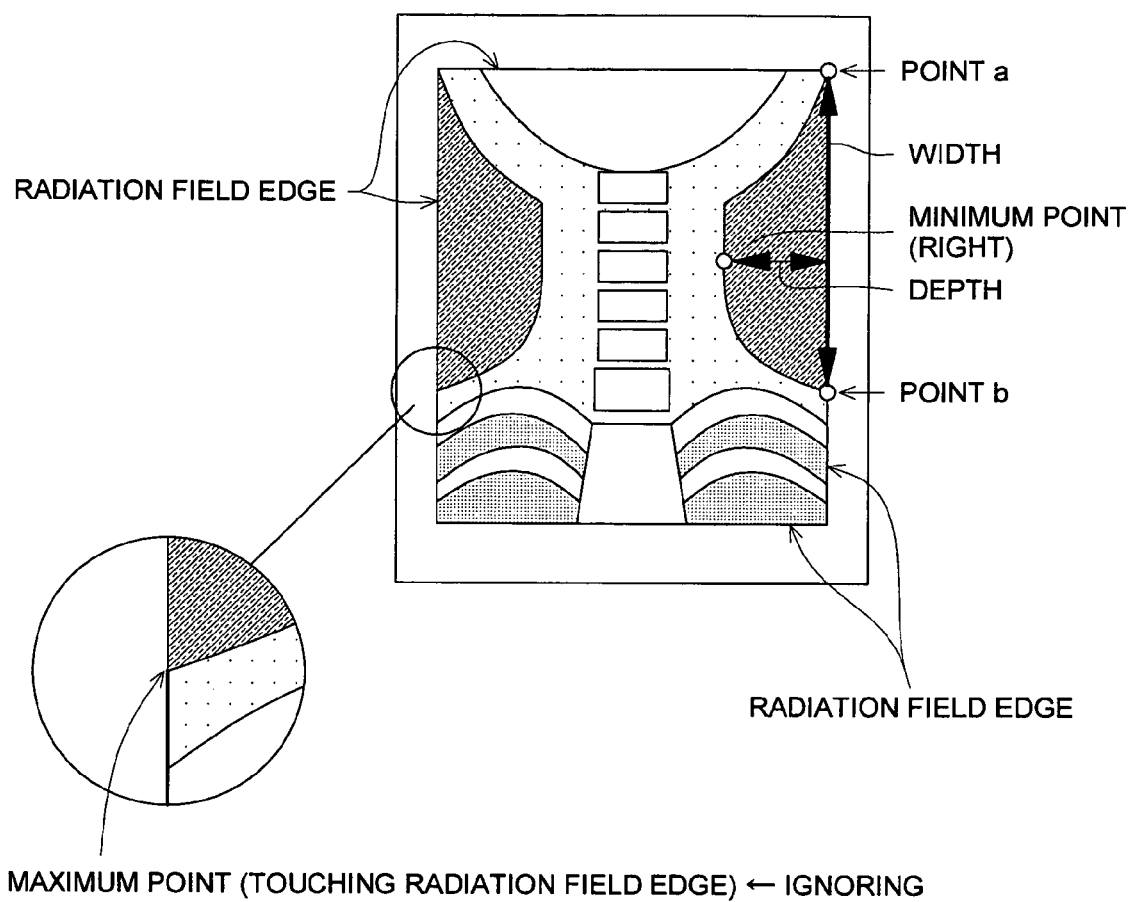
Figure 6A:
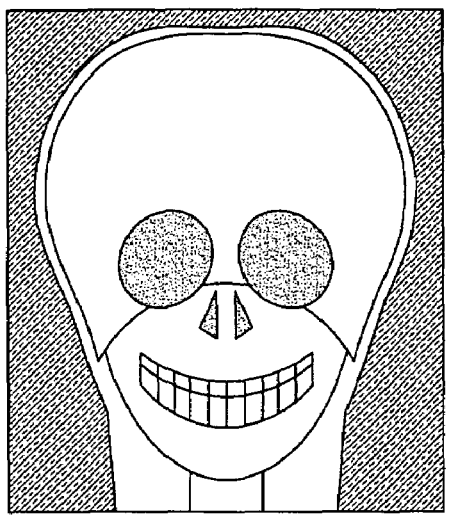
Figure 6B:
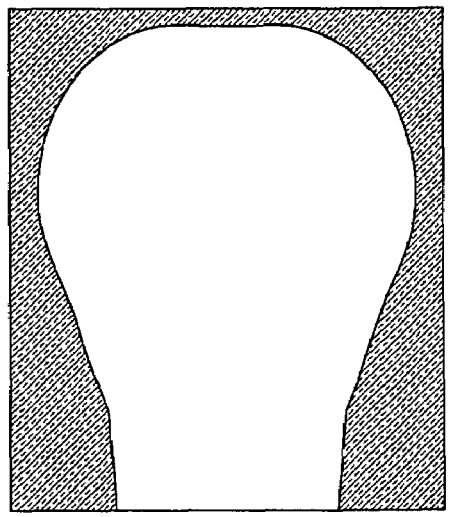
Figure 6C:
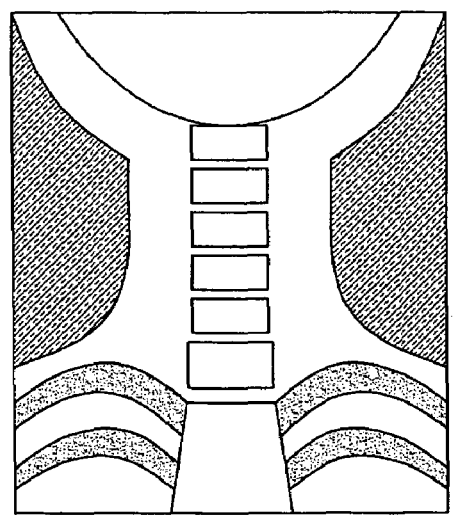
Figure 6D:
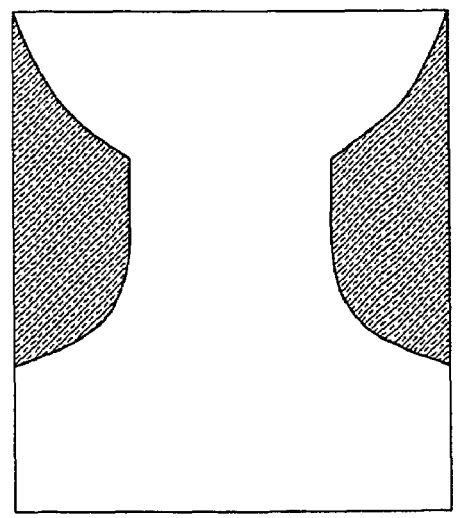

FIG. 5 is an illustration showing how an edge portion is examined in an example of an embodiment of the invention.

Each of FIGS. 6(a)-6(d) is an illustration showing how a form is specified in an example of an embodiment of the invention.

Each of FIGS. 7(a)-7(d) is an illustration showing how a form is specified in an embodiment of the invention.

Figure 8:
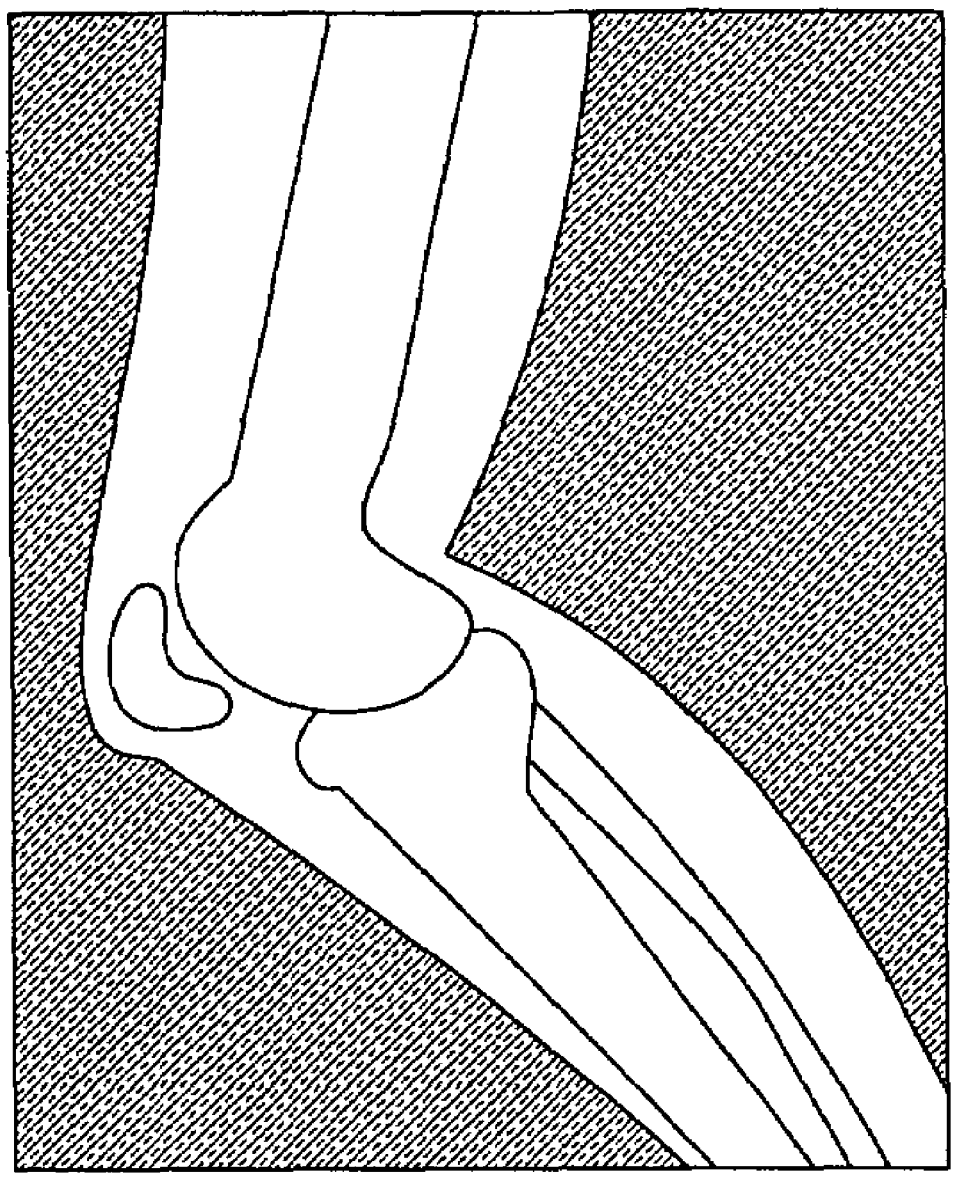

FIG. 8 is an illustration showing how a form is specified in an example of an embodiment of the invention.

Figure 9:
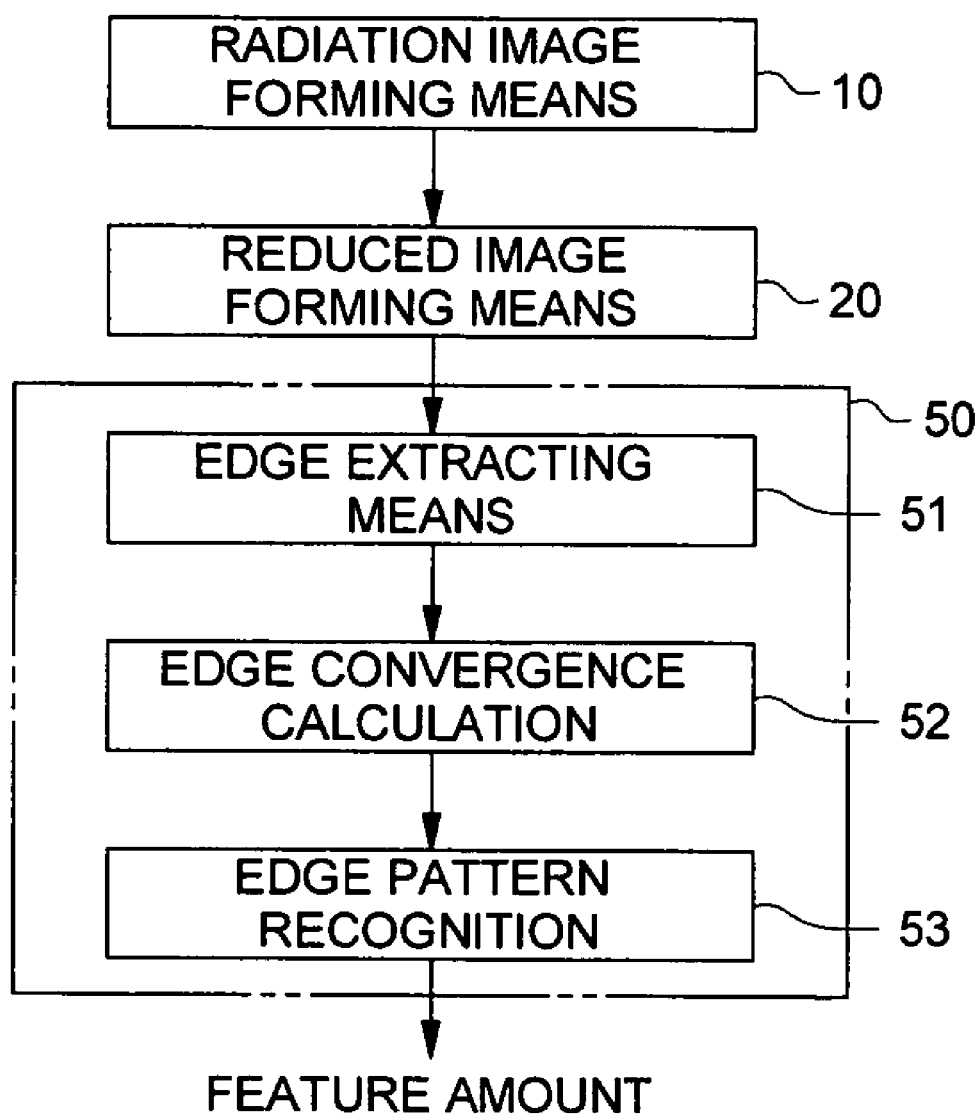

FIG. 9 is a functional block diagram showing the structure of an image processing apparatus and a flow (processing flow) of image processing in an example of an embodiment for edge feature amount extracting in the invention.

Each of FIGS. 10(a)-10(d) is an illustration showing a form of a filter for obtaining a signal variance between neighboring pixels in an example of an embodiment of the invention.

Each of FIGS. 11(a)-11(c) is an illustration showing the state of edge distribution in an example of an embodiment of the invention.

Figure 12:
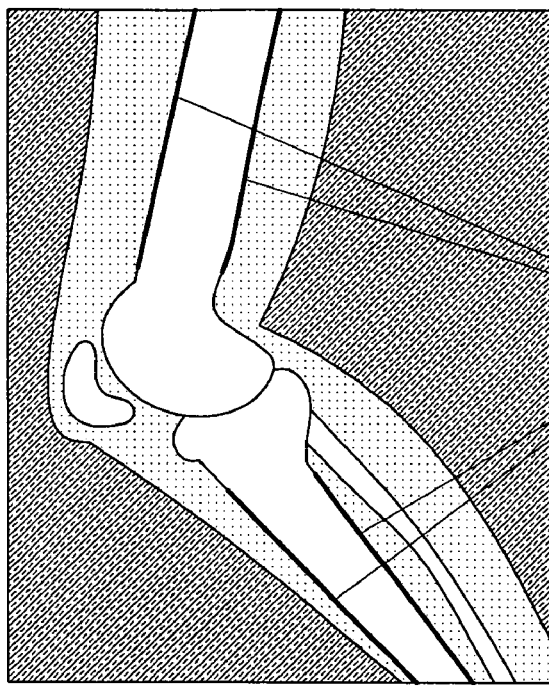
Figure 12:
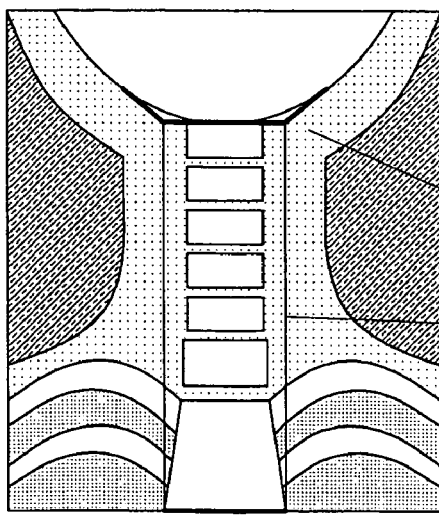

Each of FIGS. 12(a) and 12(b) is an illustration showing the state of edge distribution in an example of an embodiment of the invention.

Figure 13:
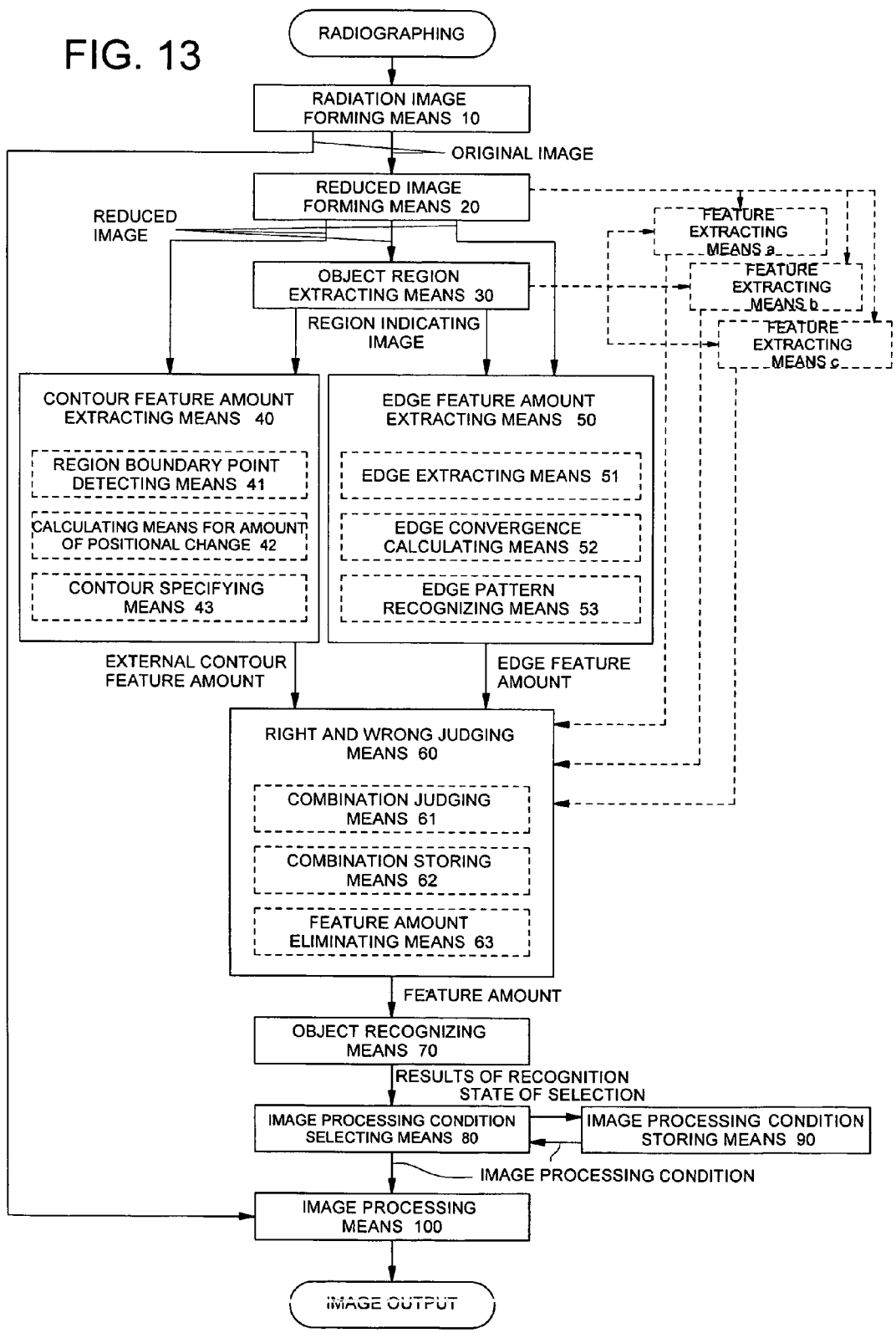

FIG. 13 is a functional block diagram showing the structure of an image processing apparatus and a flow (processing flow) of image processing in an example of an embodiment for feature amount right and wrong judgment in the invention.

Figure 14:
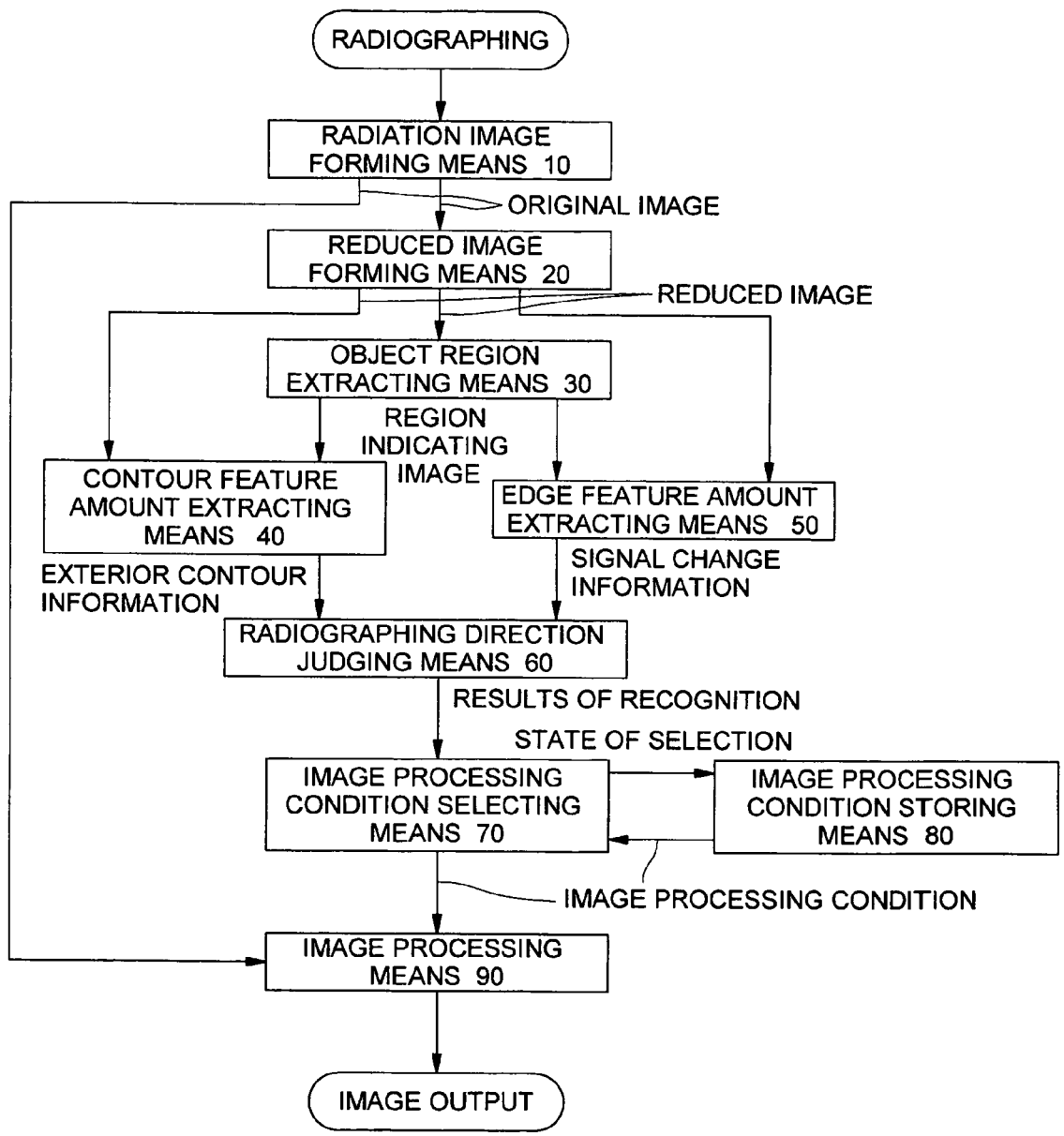

FIG. 14 is a schematic diagram of a flow of processing for radiographing orientation judgment in the invention.

Figure 15:
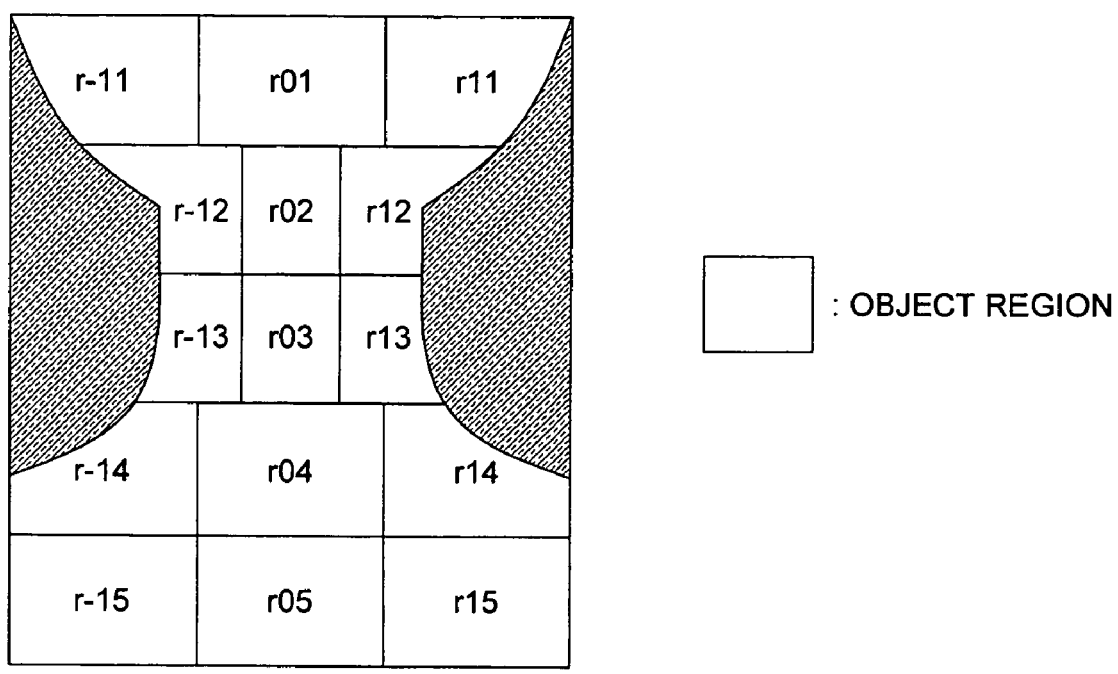

FIG. 15 is a region classifying diagram for examining distribution of pixels whose signal variance is great.

DETAILED DESCRIPTION OF THE PREFERRED EMBODIMENT

I. Contour Feature Amount Extracting

First, an example of the embodiment of contour feature amount extracting in the invention will be explained in detail, referring to the drawings.

(Structure of Image Processing Apparatus)

Figure 1:
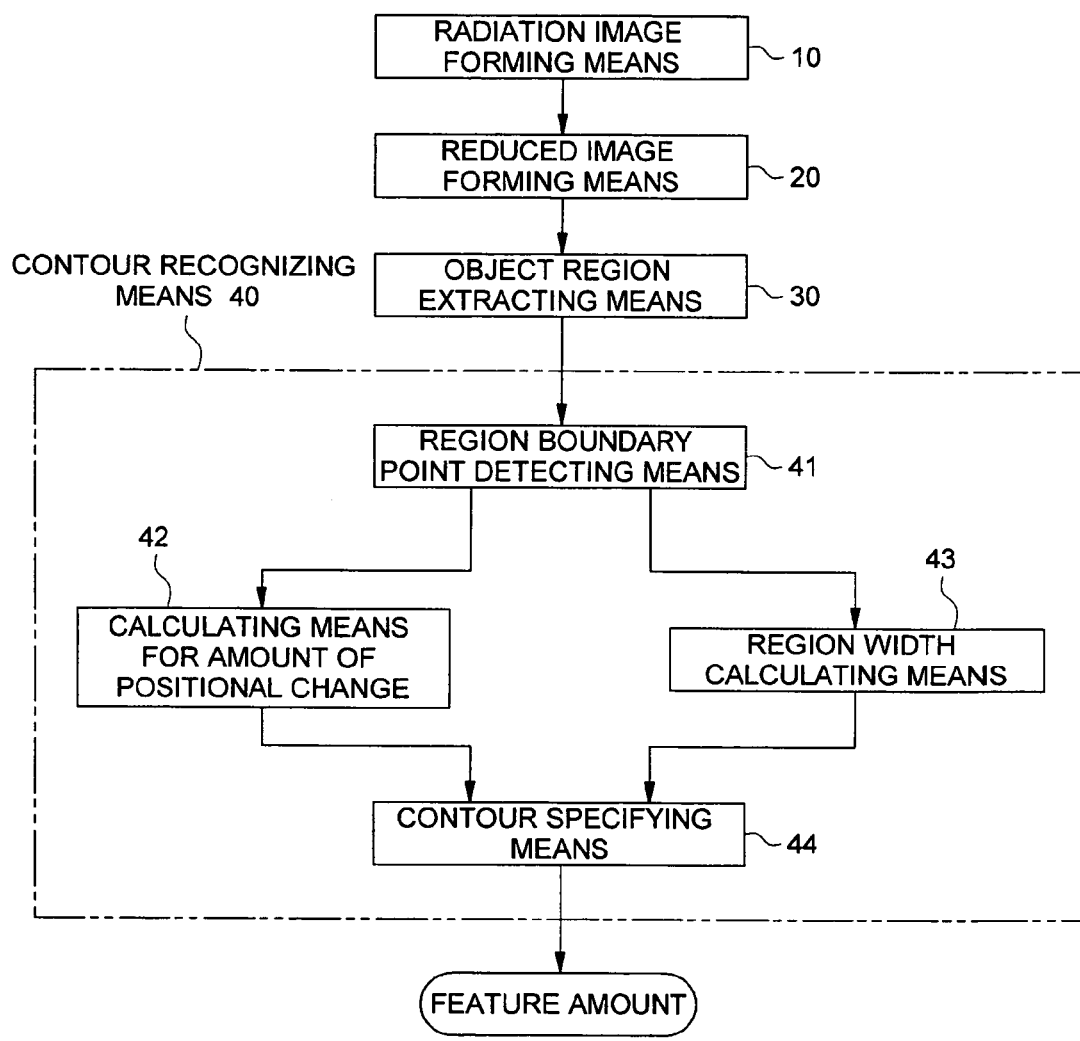
FIG. 1 is a functional block diagram showing the structure of an image processing apparatus of an example of an embodiment for contour feature amount extracting in the invention.
Figure 2:
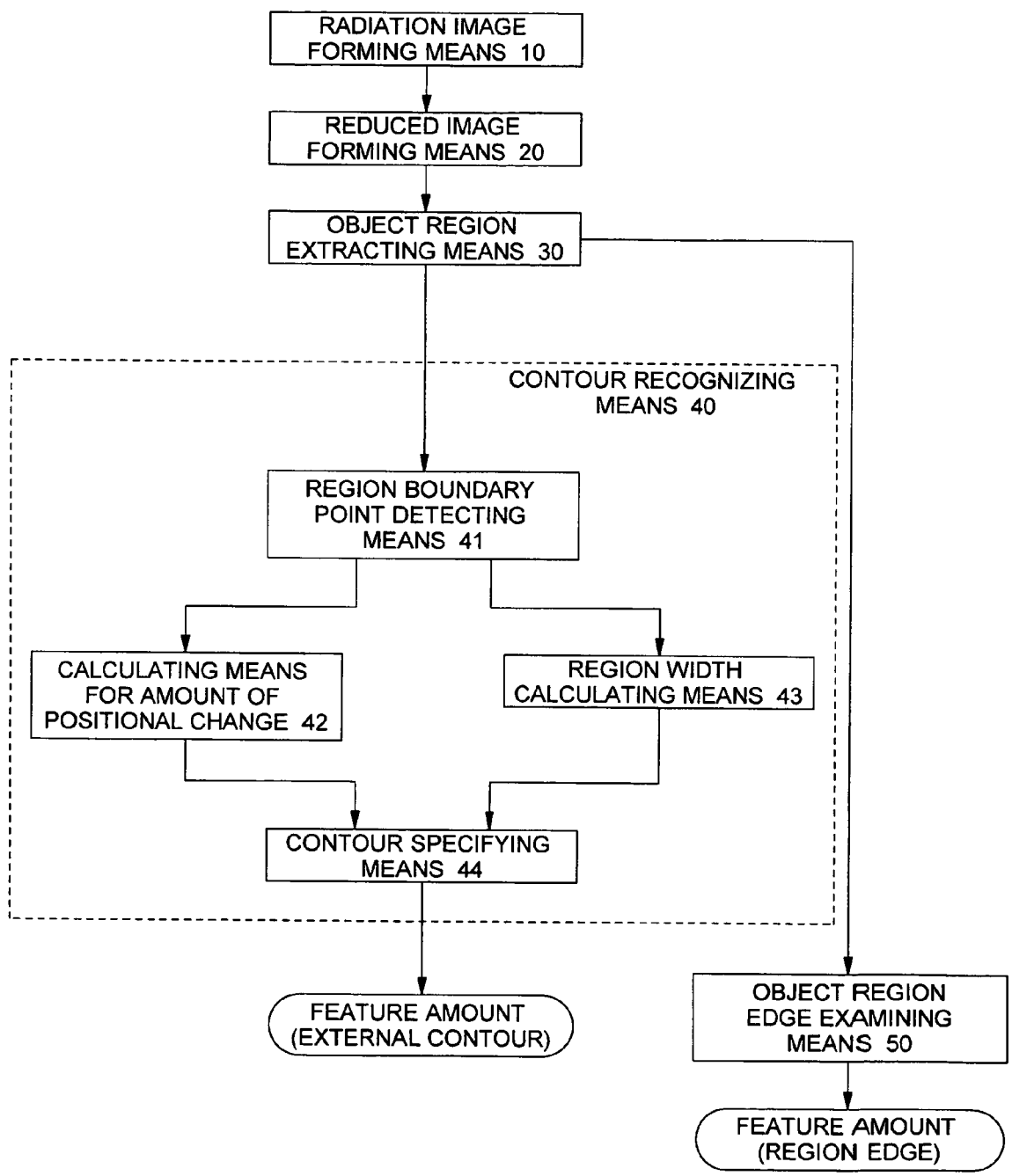
FIG. 2 is a functional block diagram showing another structure of an image processing apparatus of an example of an embodiment o f the invention.
Figure 3A:
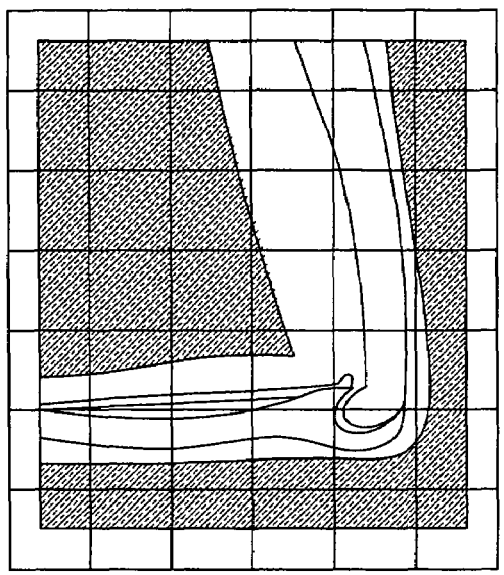
Figure 3B:
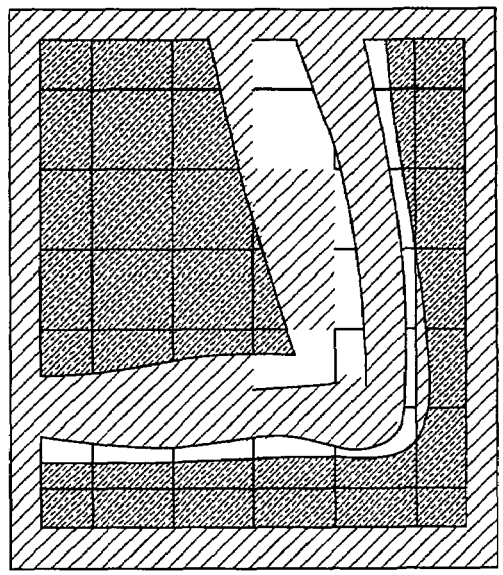
Figure 3C:
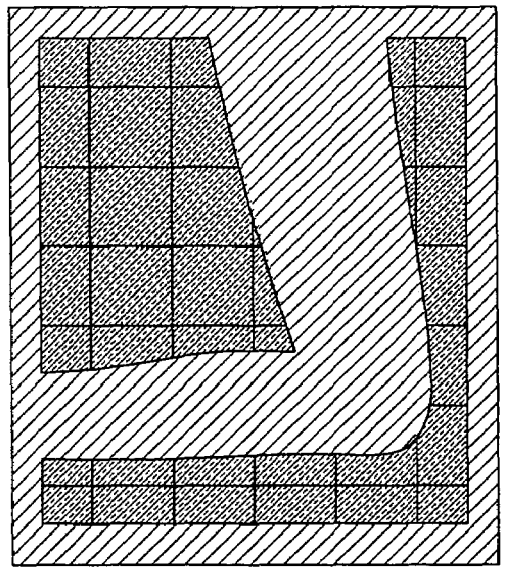
Figure 3D:
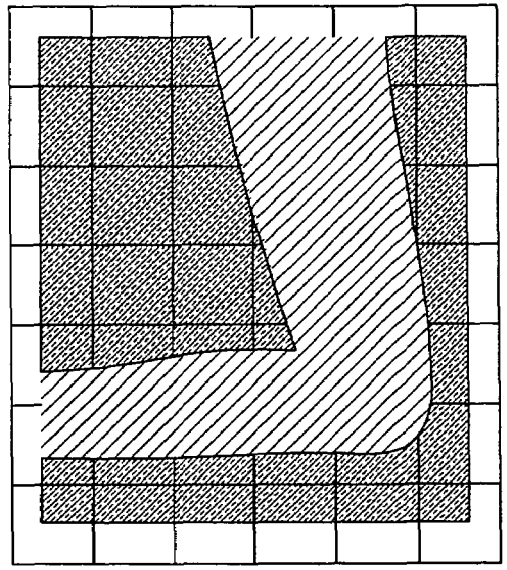

The structure of an image processing apparatus will be explained as follows, referring to FIG. 1 or FIG. 2 showing a rough block diagram. Incidentally, each means of the image processing apparatus in the present embodiment can be composed of a hardware, a firmware or a software. Accordingly, a functional block diagram following processing procedures of each means is indicated. Incidentally, the functional block diagram can be used also as a flow chart for understanding an embodiment of an image processing method. FIG. 1 is an example of the structure wherein a contour in the present embodiment is a feature amount, while, FIG. 2 is an example of the second structure wherein an edge of an object region is also a feature amount, in addition to the contour in the present embodiment.

(1) Radiation Image Forming:

As shown in FIG. 1 or FIG. 2, an image having the signal value that is proportional to a logarithm of an amount of radiations radiated by radiation image forming means 10 is acquired, and is sent to reduced image generating means 20.

As the radiation image forming means 10, it is possible to use one employing FPD explained before and a known apparatus that reads a stimulable phosphor plate and generates a radiation image.

Incidentally, in the present embodiment, let it be assumed that a signal value that is proportional to a logarithm of an irradiation amount of radiations is acquired, and the more is the irradiation amount, the higher is the signal value.

For shortening the time required for the processing thereafter, a thinned-out image wherein the number of pixels is reduced is made from an original image by reduced image generating means 20 through sampling, and the thinned-out image is transmitted to object region extracting means 30.

The thinned-out radiation image having the least possible pixels is preferable, because the time for each processing can be shortened. In the present embodiment, however, the radiation image needs to be provided with information up to the level with which the feature of a radiography object can be distinguished. Therefore, when a life-sized radiation image is obtained for each body part of the human body, a pixel size of about 1-5 mm square is preferable. Incidentally, in the explanation of the present embodiment, it is assumed that the processing hereafter is conducted by the use of a thinned-out radiation image. When the image processing apparatus conducts processing at high speed sufficiently, or when no problem is caused even when the processing takes time, radiation images which are not thinned out may be transmitted to judging means 30.

(2) Object Region Extracting:

Object region extracting means 30 conducts object region extracting as explained below (see FIG. 3).

(2a) An image is divided into a plurality of small regions (FIG. 3(*a*)).

(2b) For each small region, a mean signal value of pixel signal values included in the small region is obtained as threshold value Th1.

(2c) For each small region, the pixel whose signal value is lower than the threshold value Th1 is detected as an object region (FIG. 3(*b*)).

(2d) A mean signal value of the object region obtained in each small region is obtained, and it is made to be threshold value Th2.

(2e) Pixels each having a signal value lower than the threshold value Th2 are detected as an object region for the whole images (FIG. 3(*c*)).

(2f) For eliminating a region outside a radiation field from the detected object region, a boundary of the region outside a radiation field is obtained, and a region between the boundary and the closer image edge is eliminated as the region outside a radiation field (FIG. 3(*d*)).

(2g) The boundary of the region outside a radiation field is obtained as follows. First, a pixel positioned on the boundary of the object region is detected as a boundary point. Then, a straight line on which many boundary points in the same direction are present is detected as a boundary candidate line. With regard to the boundary candidate line, an equation of a straight line is calculated from optional two boundary points, and when the number of boundary points existing on the straight line is not less than prescribed threshold value Th3, the boundary candidate line is detected. Then, when a portion from the boundary candidate line to the image edge is mostly represented by the object region, the object region up to the image edge is eliminated as a region outside a radiation field, regarding the boundary candidate line as a boundary line of the region outside a radiation field.

Object region information showing the object region obtained by each means (each step) of the (2a)-(2g) above is given as a region indicating image having the same size as that of the thinned-out image (original image when the image obtained by radiation image forming means 10 is used directly) obtained from reduced image forming means 20, to be set to satisfy that the pixel positioned outside the object region has a pixel value of '0', the pixel included in the object region has a pixel value of '1', and the pixel positioned on the boundary line of the region outside a radiation field has a pixel value of '2'.

As a method for object region extracting means 30 to conduct object region extracting, methods shown in the following items (2h)-(2i) are also considered in addition to the aforesaid (2a)-(2g).

(2h) After a region outside a radiation field is detected by the method disclosed in TOKKAISHO Nos. 63-259538 and 63-244029 and TOKKAIHEI No. 5-7579, a signal value corresponding to the region where radiations are radiated directly is found from a form of a histogram of pixel signal values within a region of a radiation field, and a region of a radiation field remaining after the region corresponding to the signal values is excluded from the radiation field is made to be an object region. The detection of the signal value corresponding to the region where the radiations are radiated directly is made possible by obtaining, in the histogram mentioned above, the threshold values for a high signal region showing the direct radiation region and for a low signal region where the signal is lower because of transmission through a radiography object, and by regarding the region where the signal is higher than the threshold value as the direct radiation region.

(2i) To prevent an influence by unevenness caused by a heel effect or by a radiation image forming means, it is also possible to employ a method to prepare a pixel signal value histogram for each region in plural blocks prepared by division into four parts by dividing an image into two parts vertically and into two parts from side to side, for example, and thereby to conduct by a means such as a discriminant analysis that is the same as the foregoing, for detection of a threshold value for excluding the direct radiation region stated above.

Object region information showing the object region obtained by the means in (2h) above is given as a region indicating image having the same size as that of the thinned-out image (original image when the image obtained by radiation image forming means 10 is used directly) obtained from reduced image forming means 20, to be set to satisfy that the pixel positioned outside the object region has a pixel value of '0', the pixel included in the object region has a pixel value of '1', and the pixel positioned on the boundary line of the region outside a radiation field has a pixel value of '2'.

When the object region is composed of a plurality of regions which are not connected each other, only the greatest region among these regions is extracted. With regard to calculation of the number of object regions and to classification into each region, labeling processing which has been used widely, for example, can be utilized.

When the object region is classified into plural regions as stated above, the number of pixels included in each region is counted respectively, and only region where the number of pixels is greatest is made to be an object region again to update object region information.

The object region information obtained in (2a)-(2g), (2h) or (2i) is sent to contour recognizing means 40 in the case of FIG. 1 and to contour recognizing means 40 and object region edge examining means 50 in the case of FIG. 2.

(3) Contour Recognition (Contour Feature Amount Extracting):

Contour recognizing means 40 (contour feature amount extracting means) recognizes a contour, namely, a form of the object region obtained in (2) above, as will be explained below (see FIG. 4).

(3-1) Region Boundary Point Detecting Means 41:

(3-1a) Plural and different scanning lines which scan from one end to the other end of an image in succession are set in a horizontal direction and at regular intervals, for a region indicating image showing object region information.

(3-1b) Pixel values are examined on each scanning line by moving from the left end of the image toward the right side one pixel by one pixel, and a pixel on the position where the pixel value changes from '0' to '1' or from '2' to '1' is detected as a region boundary point (left). After that, pixel values are examined on the same scanning line by moving from the right end of the image toward the left side one pixel by one pixel, and a pixel on the position where the pixel value changes from '0' to '1' or from '2' to '1' is also detected as a region boundary point (right). If the pixel value on the image end is '1', a pixel on the image end on the scanning line is made to be an object region boundary point. With regard to each region boundary point detected, the value of its coordinates and information showing (left) or (right) are sent to positional change amount calculating means 42 and to region width calculating means 43.

(3-2) Positional Change Amount Calculating Means 42:

With regard to a region boundary point obtained by the region boundary point detecting means 41, a difference of the horizontal coordinates value from a neighboring region boundary point is calculated for each group on (left) or (right).

Next, from a difference of the aforesaid horizontal coordinates value, there are obtained a maximum point (corresponding to a point where the horizontal coordinates point is on the leftmost position locally in the (left) group, while, corresponding to a point where the horizontal coordinates point is on the rightmost position locally in the (right) group) where a form of the object region is 'convex', and a minimum point (corresponding to a point where the horizontal coordinates point is on the rightmost position locally in the (left) group, while, corresponding to a point where the horizontal coordinates point is on the leftmost position locally in the (right) group) where a form of the object region is 'concave', both with respect to horizontal coordinates for each group mentioned above.

Further, with respect to these polar points (maximum point and minimum point), concave and convex levels in the vicinity of the polar points are examined. The position of the polar point and the concave and convex levels are calculated in the following way.

Since the method explained below can be used in the same way for both the (left) group and the (right) group, a group on one side only will be explained.

(3-2a) Polar Point Position Detection:

For region boundary points other than those existing at the uppermost portion and the lowermost portion of the object region, following processes are conducted in succession from the upper portion of the object region.

Difference value s1 of horizontal coordinates between the region boundary point (region boundary points other than those existing at the uppermost portion and the lowermost portion of the object region) p0 and adjoining region boundary point p1 existing above the region boundary point p0 is obtained. In the same way, difference value s2 of horizontal coordinates between the region boundary point p0 and adjoining region boundary point p2 existing below the region boundary point p0 is obtained.

Next, a sign of s1×s2 is examined, and a polar point is detected when the prescribed conditions are satisfied.

In the case of s1×s2<0, the region boundary point p0 is made to be a polar point.

When s1×s2 is zero and one of sj (j=1,2) only is '0', difference values of horizontal coordinates are calculated in succession in the direction for going away from p0 with respect to other region boundary points existing at p0 and in the vicinity thereof, for the direction (upward or downward) wherein a difference value is '0'. When the difference value turns out to be those other than '0' first, sj represents the difference value again.

Then, s1×s2 is calculated again. In this case, if s1×s2 is smaller than zero, the p0 and the middle point of the region boundary points in which sj turns out to be values other than '0' first are made to be a polar point.

(3-2b) Concave and Convex Levels:

Now, concave and convex levels will be explained, referring to FIG. 5. First, difference values of horizontal coordinates are examined in succession upward from the polar point to the neighboring region boundary point, and point "a" where the difference value takes a sign which is opposite to that of the difference value in the vicinity and above the polar point, or the difference value becomes '0' is obtained. In the same way, difference values of horizontal coordinates are examined in succession downward from the polar point to the neighboring region boundary point, and point "b" where the difference value takes a sign which is opposite to that of the difference value in the vicinity and below the polar point, or the difference value becomes '0' is obtained.

With regard to these points "a" and "b", when a point where the sign is opposite to that of the difference value in the vicinity of the polar point is not found, the uppermost point and lowermost point on the vertical coordinates where a radiography object is present are made to be point "a" and point "b" respectively.

A difference between a mean value of horizontal coordinates for point "a" and point "b" and horizontal coordinates of the polar point representing a depth (see FIG. 5) and a difference of vertical coordinates between point "a" and point "b" representing a width (see FIG. 5) are made to be indexes respectively indicating the concave and convex levels of the polar point. Incidentally, as a method to obtain the aforesaid point "a" and point "b", it is also possible to use a secondary differential value of horizontal coordinates as a standard without using the difference value as a standard. In this case, even when the secondary differential value is made to be a standard, points wherein their signs are opposite to that of the secondary differential value in the vicinity of the polar point or they become '0' are made to be point "a" and point "b".

When examining the concave and convex levels, it is preferable to devise so that a distance between region boundary points for calculating the difference value is extended to a certain extent, to prevent that a change in the general situation is recognized erroneously by detecting a minute change. For example, there are available a method to use only region boundary points existing on lines dividing a length of an object region in the vertical direction (direction perpendicular to the scanning line for detecting region boundary points) into 10-30 equal parts and a method to obtain a mean horizontal coordinates value of plural adjoining region boundary points and thereby to obtain the difference value on the basis of the mean horizontal coordinates value.

There sometimes happens that a radiography object appears to be in a convex shape which is different from its original shape at the location where the object region is adjacent to the radiation field edge (see the partially enlarged view in FIG. 5). Therefore, when a polar point is a maximum point and the object region is adjacent to the radiation field edge, the polar point is regarded not to have been detected, and both the depth and the width are made to be '0'.

In the foregoing, whether the object region is adjacent to the radiation field edge or not is judged as follows. Namely, if there is a pixel whose pixel value of a region indicating image showing a radiation field edge within a prescribed distance (about 1-3 pixels) is '2' in plural region boundary points which are present to be near and at the upper portion or lower portion of the polar point, the object region and the radiation field edge are judged to be adjacent to each other.

The polar point having large concave and convex levels among those obtained in the aforesaid manner is considered to represent a contour mostly. So, the polar points in a prescribed quantity (quantity of about 1-3 is preferable) are extracted in the order wherein the polar point whose depth in terms of an absolute value is greatest comes first, for each group at (left) or (right), and information of the polar point including a position, either one of concave and convex, a depth and a width thereof are made to be positional change amount information as one set.

In the same way as in the case of the positional change in the horizontal direction of the radiography object stated above, polar points are obtained even for a positional change in the vertical direction, and are sent to contour specifying means 44 respectively as positional change amount information.

(3-3) Region Width Calculating Means 43:

In the case of region width calculating means 43, there is obtained a distance between boundary points which are present on the same scanning line among the region boundary points mentioned above. The distance thus obtained is sent to contour specifying means 44, as region width information, together with a coordinates value in the vertical direction for the scanning line.

(3-4) Contour Specifying Means 44:

In contour specifying means 44, a contour is specified by classifying into a plurality of patterns prepared in advance, from the obtained positional change amount information and region width information. Characteristics of a contour of a human body in radiographing vary depending on a region representing a radiography object. In the case of an image of head shown in FIGS. 6(*a*) and 6(*b*) representing an example, when positional change amount information obtained from each of (left) group and (right) group is examined from an upper end of the image to the lower end, changes to approach the left end and the right end of the image are observed on the half way, and then, changes to go away from the image end are observed, thus, the contour can be classified to be a "barrel type". In the case of a cervix image as shown in FIGS. 6(*c*) and 6(*d*), changes to go away from the image end are observed on the half way on the contrary, and then, changes to approach the image end again are observed. In this case, the contour can be classified to be an "sandglass type".

Figure 7:
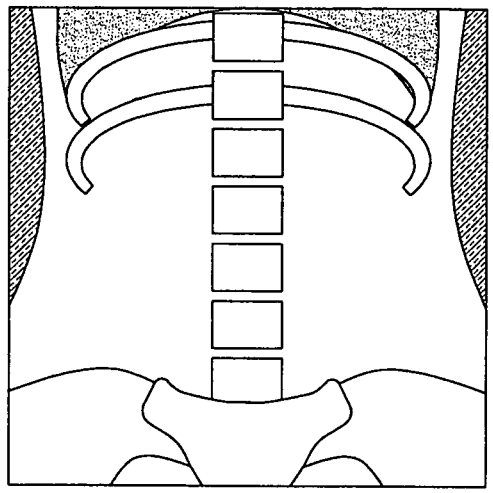
Figure 7:
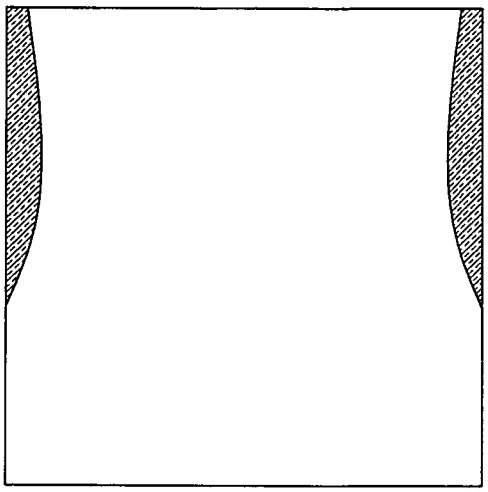
Figure 7:
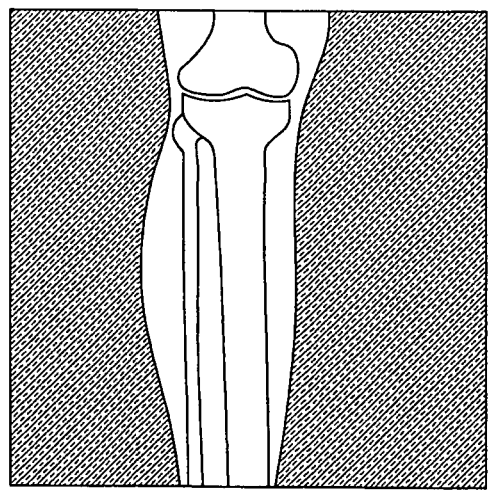
Figure 7:
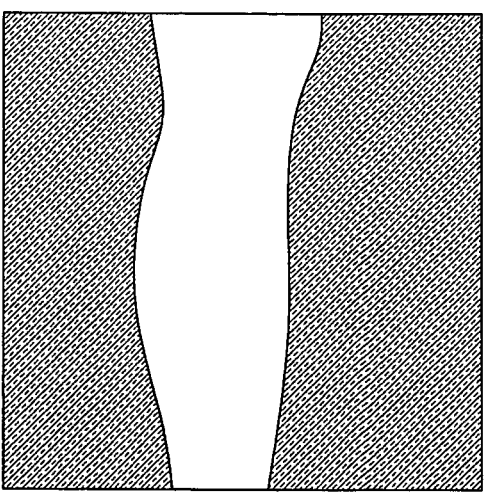

Further, with regard to an abdomen image shown in each of FIGS. 7(*a*) and 7(*b*) and a lower limb image shown in each of FIGS. 7(*c*) and 7(*d*), positional change of region boundary points in the horizontal direction is slight and a contour is almost rectangular. By using region width information, however, the abdomen image and the lower limb image can be classified respectively to be a "square type" and a "rectangular type" because the abdomen image is wide in width and the lower limb image is narrow in width.

Further, in a knee joint image shown in FIG. 8, the contour can be classified to be a "boomerang type" since a knee joint portion is bent on its half way. In addition to the foregoing, classifications of a "fan type" for a shoulder joint, a "ramification type" for fingers, a "one side convex type" for a heel, and a "triangle type" for a clavicle are considered.

(3-4a) Detailed Explanation of Exemplified Classification:

By using the positional change amount information and region width information, a contour of a radiography object is classified to be the optimum one among some patters shown above.

(3-4a"1") Condition of Classification Into Barrel Type:

For example, conditions for classification of a "barrel type" are defined as follows.

A polar point having the greatest width is convex for both (left) and (right).

The position of each polar point is at the center of a portion generated by dividing a radiography object in the vertical direction into three equal parts.

The depth of each polar point is not less than 20% of a mean width of a radiography object in the horizontal direction.

(3-4a"2") Condition of Classification Into Sand Glass Type:

Conditions for classification of a "sandglass type" are defined as follows.

A polar point having the greatest width is concave for both (left) and (right).

The position of each polar point is at the center of a portion generated by dividing a radiography object in the vertical direction into three equal parts.

The sum total of depths of both polar points is not less than 20% of a mean width of a radiography object in the horizontal direction.

(3-4a"3") Condition of Classification Into Boomerang Type:

Conditions for classification of a "boomerang type" are defined as follows.

A polar point having the greatest width is convex for one of (left) and (right) and concave for the other of them.

The depth of each polar point is not less than 10% of a mean width of a radiography object in the horizontal direction.

(3-4a"4") Condition of Classification Into Square Type and Rectangular Type:

Further, conditions for classification of a "square type" or a "rectangular type" are defined as follows.

The depth of the polar point having the greatest depth is less than 10% of a mean width of a radiography object in the horizontal direction.

With regard to a ratio of a length of a radiography object in the horizontal direction to that in the vertical direction, if the ratio is less than 2 on the basis of the shorter length, it means a "square type".

With regard to a ratio of a length of a radiography object in the horizontal direction to that in the vertical direction, if the ratio is not less than 2 on the basis of the shorter length, it means a "rectangular type".

Incidentally, classification conditions shown in the concrete examples stated above are just an example, and other classification conditions are also considered.

(3-4b)

As stated above, a contour is classified into some patterns by positional change amount information and region width information. The results of the classification are outputted as a feature amount obtained eventually. For example, the results of output are stored to be related to each element of form vector S representing the results of classification. The form vector S is indicated when only element corresponding to the aforesaid results of classification has values other than '0'. For example, element numbers corresponding to "barrel type", "sand glass type", "boomerang type", "square type" and "rectangular type" are respectively set to be '0', '1', '2', '3' and '4'. Then, when the classification result is "barrel type", vector S [0] is stored to be 1, while, when the classification result is "sand glass type", vector S [1] is stored to be 1. Thus, the form vector S is outputted as a feature amount from contour specifying means 44 as stated above.

(3-4c) Classification Judgment Criteria:

Further, in some cases, it is difficult to classify simply the type. Therefore, it is also possible to weight a feature amount corresponding to a pattern that can be a candidate and thereby to output. In this case, a plurality of elements among the aforesaid form vectors S are set to have values other than '0' so that the sum total of values of the elements may be a certain value (for example, '5'). In this case, a value is assigned to each element in a way that an element corresponding to the form of higher probability is given a greater value.

For example, when the condition of the depth is not satisfied slightly in the judgment criteria of the "sand glass type", for example, when the sum total of the depth of a polar point is only 18% for a mean width of a radiography object in the horizontal direction, it is delicate to classify whether as "square (rectangular) type" or as "sand glass type". In this case, a value is assigned for both an element representing "sand glass type" of form vector S and an element representing "square (rectangular) type".

As an example of assigning a value, in this case, element S [3 (4)] representing "square (rectangular) type" is made to be 5 and element S [1] representing "sand glass type" is made to be zero when the sum total of the depth is not more than 10%, and the value of S [3 (4)] is reduced by '1' and S [1] is increased by '1' contrary every time the sum total of the depth is increased by 2% for the mean width of a radiography object in the horizontal direction. In addition to the example between the "sand glass type" and the "square (rectangular) type", the same judgment classification criteria as in the foregoing can be applied also between "barrel type" and "square (rectangular) type", between "square type" and "rectangular type", and between "boomerang type" and "square (rectangular) type".

(3-5) Object Region Edge Examining Means 50:

Further, how an object region is adjacent to an image edge or how an object region is adjacent to a radiation field edge is useful information for recognizing a radiography object.

For example, when a radiography object is one obtained by radiographing a chest or an abdomen, a human body is greater than a range wherein an image can be acquired, in the case of a radiographing apparatus that is used commonly. Therefore, a radiography object comes in contact with at least image edge or with upper and lower portions (or left and right portions) of a radiation field edge. On the other hand, when a radiography object is one wherein fingers or the foot tip is radiographed, there sometimes is a case where a radiography object comes in contact with only one end in the vertical or horizontal direction among an image edge or a radiation field edge, because the radiography object is small.

Further, in radiographing of a shoulder joint, there are many cases where a radiography object touches only two adjoining directions among image edges or radiation field edges in the vertical and horizontal directions, and hardly touches remaining edges.

As stated above, it is possible to obtain information for specifying a radiographing body part of a radiography object based on the degree of contact between an object region and an image edge and radiation field edge.

For obtaining information of the degree of contact, therefore, the number of pixels which are in contact with a radiography object are counted for each of edge sides in the vertical direction and the horizontal direction for image edges or radiation field edges. A judgment for the contact is outputted as information of contact between a radiography object and an image edge or between a radiography object and a radiation field edge, namely, as a feature amount based on the degree of contact.

(4) Output and Utilization of Feature Amount:

(4-1) As in (3-4) above, a contour is classified into some patterns based on information of positional change amount and information of region width. The results of the classification are outputted as a feature amount obtained finally (see FIG. 1). As stated above, this feature amount can be used as information which is extremely useful for specifying a body part of a radiography object. Namely, it is possible to extract the feature amount correctly and to recognize each body part radiographed accurately even in the case wherein body parts radiographed cover many aspects from head to extremity and a region to be looked by a doctor varies in radiographing used for diagnoses.

(4-2) As in (3-5) above, a feature amount obtained finally is outputted even by the degree of contact. As stated above, this feature amount can be used as information which is extremely useful for specifying a body part of a radiography object. Namely, it is possible to extract the feature amount correctly and to recognize each body part radiographed accurately even in the case wherein body parts radiographed cover many aspects from head to extremity and a region to be looked by a doctor varies in radiographing used for diagnoses.

(4-3) Then, by using (using jointly) two types of feature amounts including a feature amount based on the aforesaid contour and a feature amount based on the degree of contact between the contour and an image edge or between the contour and a radiation field edge (see FIG. 2), a body part and a posture of a radiography object in a radiation image can be recognized more accurately.

Though the scanning is conducted only in the horizontal direction of an image in the embodiment above, it is preferable, for specifying a form more accurately, to conduct scanning also in the vertical direction, and to obtain information of a positional change and information of a region width after detecting a region boundary point in the same way, to utilize them for specifying a form.

To recognize a body part and a posture of a radiography object more accurately, it is preferable that a feature amount based on a contour obtained by the invention and a feature amount based on the degree of contact between the contour and an image edge or a radiation field edge are used jointly with another feature amount obtained by another means. Another feature amount which can be used for recognizing a body part and a posture of a radiography object includes "a size of an object region", "density distribution", "distribution of an amount of density change", "symmetric property of an object region form" and "symmetric property of density distribution".

As explained in detail above, it is possible, in the present example, to specify a contour of a radiography object and thereby to recognize a body part of radiographing correctly, by extracting a positional change of a boundary of an object region and a change of a width of the region as a feature amount, after extracting the object region.

It is further possible to extract an effective feature amount or recognizing the body part of radiographing, because a degree of contact between a contour and an image edge or between a contour and a radiation field edge is examined and a feature amount is extracted based on the degree of contact.

Further, it is possible to recognize more correctly a body part and a posture of a radiography object in a radiation image by utilizing (using jointly) two types of feature amounts including a feature amount based on the contour and a feature amount based on the degree of contact between the contour and an image edge or between a contour and a radiation field edge.

Therefore, it is possible to select conditions for optimum gradation processing automatically, and to obtain optimum images for diagnoses automatically without complicated operations.

II. Extracting Edge Feature Amount

Next, an embodiment of extracting an edge feature amount will be explained.

In a boundary between a bone portion and a soft portion and in a contour of a lung, there is a big difference of a signal value of a pixel between regions bestriding the boundary because an absorption amount of radiations varies depending on composition of structures. It is therefore possible to grasp existence of the structures by examining a change of signals between neighboring pixels.

As shown in FIG. 9, edge feature amount extracting means 50 is composed of edge extracting means 51, edge concentration rate calculating means 52 and edge pattern recognizing means 53.

They will be explained in succession as follows.

(5-1) Edge Extracting:

A method to obtain a signal variance between neighboring pixels by the use of the edge extracting means 51 includes a method that is based on the primary differentiation and a method that is based on the secondary differentiation. When the secondary differentiation is used in particular, a monotonous change in a thickness of a human body is difficult to be detected, and a change in composition can be grasped more faithfully. In the edge extracting means 51, therefore, the signal variance between neighboring pixels is extracted by the operation processing corresponding to the secondary differentiation.

(5-1-a) In the thinned-out image stated above, operation processing is conducted for each pixel $P_{x,y}$ (x: coordinates value in the horizontal direction, y: coordinates value in the vertical direction) included in the object region, by the use of four types of filters shown in FIGS. 10(a)-10(d). Edge intensity information $Q_{x,y}$ obtained as results of the operations is expressed as follows;

$$Q_{x,y} = a\ max\ (\Sigma\Sigma P_{x+i,\ y+j} M_{n i,j})$$

wherein, $M_{n i,j}$ shows a value of each filter (n=1, 2, 3 and 4). a max ( ) shows that the results of operation conducted by using each filter are compared in terms of an absolute value, and the maximum absolute value is represented by $Q_{x,y}$.

Figure 10:
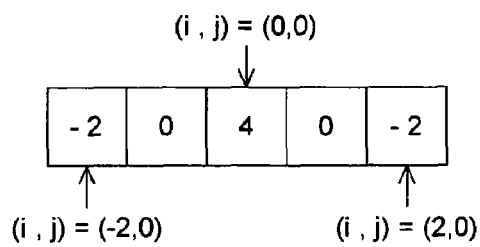
Figure 10:
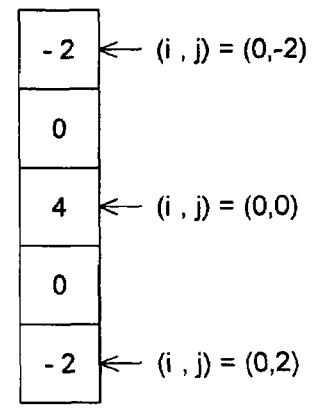
Figure 10:
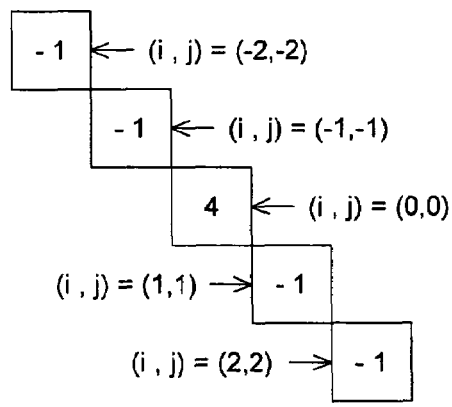
Figure 10:
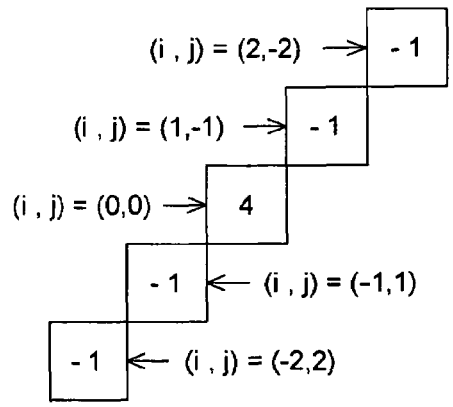

A value of each pixel of $M_{n i,j}$ is assumed to be a numerical value described in an individual frame of each pixel shown in FIG. 10.

Further, when a pixel to be multiplied by a filter value is out of an image not to be present, in the case of the aforesaid operation at the image edge, a value of a central pixel of filter operation is substituted for the pixel to be out of the image on a virtual basis for the operation processing.

(5-1-b) Further, the number n corresponding to the filter selected by a max ( ) through the operation processing mentioned above is stored in edge direction information $D_{x,y}$ for each pixel, as $D_{x,y} = n$. The edge direction information $D_{x,y}$ turns out to be an index showing the edge direction of the pixel. For example, in the case of n=1, an edge in the horizontal direction is indicated, and in the case of n=2, an edge in the vertical direction is indicated.

(5-1-c) In the pixel having important information about edges of bone portions and others, a signal variance between neighboring pixels is large. It is therefore possible to obtain important edge information by extracting only pixels each having a great edge intensity from the edge intensity information $Q_{x,y}$.

Therefore, values of $Q_{x,y}$ are totalized for an entire image, and values of $Q_{x,y}$ from the greatest are judged whether they belong to α% of the total for each pixel or not, and the results of the judgment are stored in edge selection information $L_{x,y}$. In this case, $L_{x,y}$ is expressed by the following expression.

$L_{x,y} = 1$ (when values of $Q_{x,y}$ from the greatest is within α% of the total)

$L_{x,y} = 0$ (when values of $Q_{x,y}$ from the greatest is not within α% of the total)

It is preferable that the α% stated above is 5-40% for obtaining necessary edge information correctly.

Since it is considered that, when a radiography object is small comparatively, a region of bone portions included in the radiography object is considered to be increased, the value of α is changed depending on a size of the object region, and it is preferable that the smaller the object region is, the greater the value of α is. A size of the object region can be evaluated by obtaining the sum total of the number of pixels each having pixel value of '1' in the region indicated image.

Edge direction information $D_{x,y}$, edge selection information $L_{x,y}$ and edge intensity information $Q_{x,y}$ all obtained by the aforesaid means are sent to edge concentration rate calculating means 52 as signal variance information.

(5-2) Edge Concentration Rate Calculation:

In the edge concentration rate calculating means 52, continuity and concentration rate of the edge are examined from the edge direction information $D_{x,y}$, the edge selection information $L_{x,y}$ and the edge intensity information $Q_{x,y}$ obtained.

When a human body is radiographed, characterized patterns are generated, depending on a region representing a radiography object and the radiographing orientation. As an example, when a limb bone such as a leg image shown in FIG. 11(a) is a radiography object, intensity is relatively great along a boundary of a bone, and edges having component in the direction perpendicular to a boundary line are present continuously. Continuous edges in the same direction like this also appear on a lung contour and an edge of a jawbone.

When a spine is a main radiography object is a spine like a lumbar spine shown in FIG. 11(b), edges having great intensity are concentrated on a spine portion, but directions of those edges are not the same, because a spine is a congregation of small bones.

By obtaining continuity and concentration rate of the edge such as "continuous edges in the same direction" (appearing on a limb bone and a lung contour), and "nondirectional edge concentration lines" (appearing on a spine portion) as shown below, it is possible to obtain information that is useful for recognizing a body part of the radiography object.

(5-2-a) Extracting Continuous Edges in the Same Direction:

(5-2-a-1)

In target pixel $I_{x,y}$ with $L_{x,y} = 1$, when edge components in the same direction are owned and $L_{i,j}$ is equal to 1 and $L_{k,l}$ is equal to 1 in the same way as in $I_{x,y}$, for both adjoining pixels $I_{i,j}$ and $I_{k,l}$ in the direction perpendicular to the edge direction shown on $D_{x,y}$, a value of $L_{x,y}$ is increased by '1'.

(5-2-a-2)

Next, with regard to target pixel Jx,y with Lx,y=2, when edge components in the same direction are owned and Li,j is equal to 2 and Lk,l is equal to 2 in the same way as in Jx,y, for both adjoining pixels Ji,j and Jk,l in the direction perpendicular to the edge direction shown on Dx,y in the same way as in the (5-2-a-1), a value of Lx,y is increased by '1'.

(5-2-a-3)

Then, the processing of (5-2-a-2) above is repeated m times. Thereupon, when edges in quantity of (m+2) or more which are in the same direction and have intensity of a certain level or higher are continuous, Lx,y=m+1 stands on the pixel at the center of the continuous edges. Then, threshold value Thd1 established in advance is compared with a given pixel in terms of a value of Lx,y, and when the following expression stands;

$$Lx,y > Thd1 \quad (1)$$

a pattern of "continuous edges in the same direction" is extracted.

In this case, it is preferable that the threshold value Thd1 takes a value corresponding to about 5-20 cm in the exact size of a radiography object.

The pattern extracted in this case is stored in array A1 [u] (u=0, 1, . . . ) as a coordinates value of the center pixel in the pattern (a coordinates value of a pixel satisfying the expression (1) above, while, in the case of plural neighboring pixels, a value of any one of the plural pixels). The number of the extracted patterns is stored on an element of v=0 in array B [v].

For shortening calculation time in processing, the method which will be explained below may also be used in place of the methods shown in the aforesaid (5-2-a-1)- (5-2-a-3).

(5-2-a-4) An image is divided into a plurality of small regions. It is preferable that an individual small region is of about 3×3 pixels-10×10 pixels.

(5-2-a-5) For each small region, the number of pixels each included in the small region and is represented by Lx,y=1 is totalized for each edge direction shown with Dx,y, and is stored in Cn (n=1, 2). In this case, n is assumed to be the same as an index of the edge direction owned by the aforesaid Dx,y.

(5-2-a-6) Based on the totalization in (5-2-a-5), when the number of edge components Cm in the specific direction m (m=1, 2) commands a majority and has a value of a certain level or more, and when similar small regions are present to be adjacent to each other, let it be assumed that a pattern of "continuous edges in the same direction" is included in the small region.

In this case, an optional pixel included in the small region (for example, the center of the region, the center of gravity of the pixel satisfying Lx,y=1) is stored in the aforesaid array A1.

(5-2-a-7) It is further possible to blend the methods in (5-2-a-1)-(5-2-a-3) and the methods in (5-2-a-4) (5-2-a-6) into one, and thereby to make a pattern of "continuous edges in the same direction" to be included in the small region where a large number of Lx,y>a (a: optional values greater than 0) obtained in (5-2-a-1)- (5-2-a-3) are present.

(5-2-b) Extracting nondirectional edge concentration lines:

(5-2-a-1) First, an image is divided into a plurality of small regions. It is preferable that an individual small region is of about 3×3 pixels-10×10 pixels.

(5-2-b-2) For each small region thus divided, the number of pixels each included in the small region and is represented by Lx,y=1 is totalized for each edge direction shown with Dx,y, and is stored in Cn (n=1, 2). In this case, n is assumed to be the same as an index of the edge direction owned by the aforesaid Dx,y. The sum total of each Cn is stored in CO.

(5-2-b-3) When there are present continuously and in a straight line the small regions in quantity of Thd 3 or more where CO of the storage takes the value greater than value Thd 2 that is established in advance, these small regions are extracted.

(5-2-b-4) Cn in each small region extracted in (5-2b-3) is totalized for each value of n, and when edge components only in the specific direction are not many, a pattern of "nondirectional edge concentration lines" is detected on the portion shown by the extracted small region.

The extracted pattern stores on array A2 a coordinates value of the specific pixel in the small region existing on each of both ends among the aforesaid extracted small regions. Further, a value of '1' is stored on an element of v=1 of array B [v]. When "nondirectional edge concentration lines" are not be detected, B [1] is made to be equal to 0.

(5-2-b-5) A means to judge whether the number of edge direction components in the specific direction among a plurality of edge direction components is large or not in the aforesaid (5-2-a-6) and (5-2-b-4) includes a statistical method such as a $\chi^2$-detection and a method by means of a simple judgment such as one for judging whether the number of components in the specific direction accounts for a certain percentage of the total number.

(5-3) Extracting Feature Amount:

Based on the pattern obtained by the edge concentration rate calculating means 52 stated above, a feature amount can be extracted by edge pattern recognizing means 53. In a simple way, the values of A1, A2 and B stated above can be extracted as they are as a feature amount.

However, it is possible to extract a feature amount that is more useful, by considering a combination of the number and positions of the detected patterns.

For example, in the case of a bone that is relatively long like a limb bone, there is detected a pattern of "continuous edges in the same direction" for both sides of the bone. Therefore, when two "continuous edges in the same direction" are present to be close to each other and to be almost in parallel with each other, an edge pattern is extracted as "a long bone" for example.

On the other hand, in the case of a cervical spine, existing "continuous edges in the same direction" is represented by only one on a contour of a jawbone. Further, on the chest, "continuous edges in the same direction" are detected on a lung contour to be out-of-the-way. Therefore, the edge pattern is extracted as "a contour". Further, patterns may also be classified by the number of the extracted "continuous edges in the same direction" and by an inclination of the radiography object from the longitudinal direction.

Further, in the case of a lumbar spine or the like, "nondirectional edge concentration lines" can be detected on the spine portion. Therefore, presence of "nondirectional edge concentration lines" makes the edge pattern to be "a spine". In addition to this, the pattern may also be classified by the position of "nondirectional edge concentration lines" occupied in the object region. The results of the classification such as "a long bone", "a contour" and "a spine" are stored in edge pattern vector E that is similar to form vector S.

Figure 11:
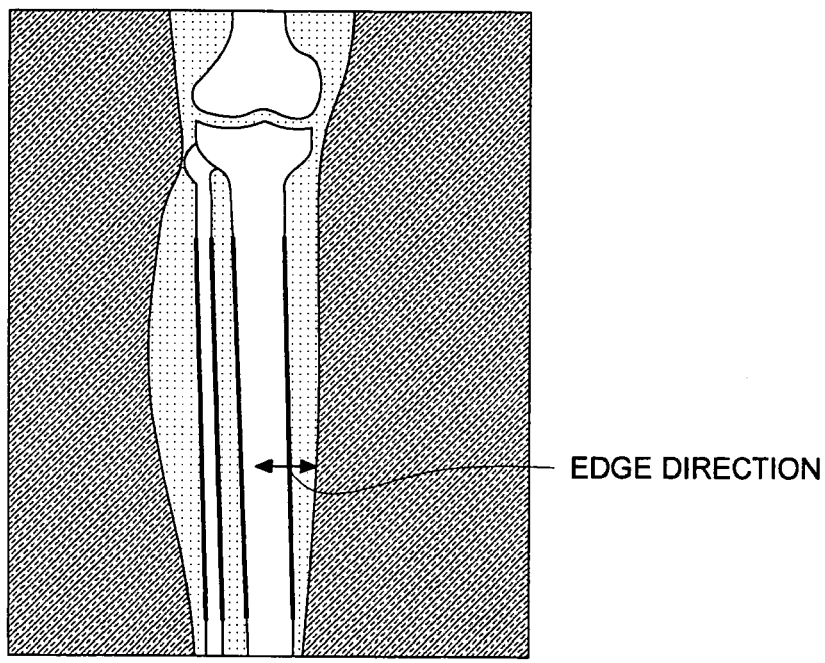
Figure 11:
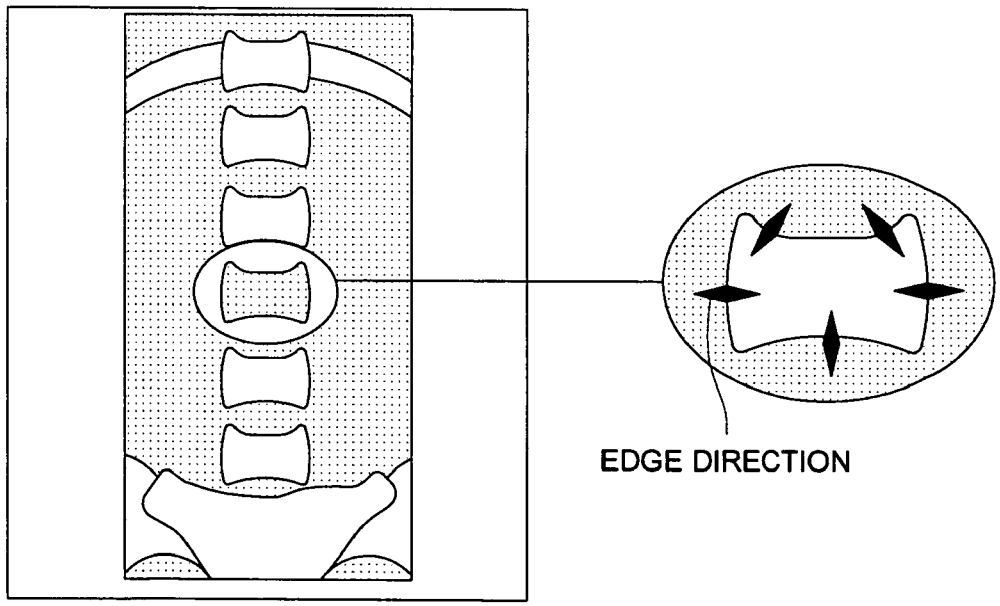

In the foregoing, when the pattern of "continuous edges in the same direction" exists in the vicinity of the image center as shown in FIG. 11(*a*), for example, a judgment is formed to mean that a specific limb bone (lower femnur in FIG. 11(*a*)) has been radiographed.

When a plurality of patterns are present to be away from each other as shown in FIG. 12(a), a relatively large bone like a limb bone is considered to be present in each position where each pattern is present. Namely, it is understood that a joint connecting the relatively large bones is also radiographed.

When "nondirectional edge concentration lines" and "continuous edges in the same direction" are present to cross each other at right angles, a possibility for a cervical spine shown in FIG. 12(b) is considered to be high.

It is also possible to discriminate a radiography object directly by the combination of the detected patterns as mentioned above. It is therefore preferable to give each different value E to each combination of the aforesaid patters as a feature amount to make the combination to be distinguishable, and to extract E as a feature amount.

In radiographing, a radiation shielding plate that is called a radiation field diaphragm is frequently used for avoiding useless exposure to a human body. In this case, a linear edge caused by an edge of the radiation field diaphragm exists on an image, and the linear edge is extremely confusing when extracting the "continuous edges in the same direction", and causes erroneous recognition.

For obtaining a feature amount caused by distribution of the aforesaid signal variance more accurately, it is preferable to conduct processing to extract first from an image the "object region" where a radiography object is radiographed, and to detect the pattern mentioned above by using only pixels included in the object region, as explained in extraction of a contour feature amount.

For recognizing a radiographing body part of a radiography object and its direction more accurately, it is also preferable to use jointly a feature amount caused by distribution of signal variances obtained through the embodiment of the invention and another feature amount obtained by another means. As other feature amounts utilized for recognizing a radiographing body part of a radiography object and its direction, there are given "a size of an object region", "density distribution", "a contour of an object region", "objectification of an object region form" and "symmetrization of density distribution".

Though extraction of signal variance amount based on the secondary differentiation as well as pattern recognition and feature extraction both employing the extraction of signal variance amount have been explained in the explanation of the embodiment above, a filter to be used for extraction of signal variance amount is not limited to secondary differentiation, and it may also be a filter based on primary differentiation such as, for example, sobel filter and Prewitt filter.

As explained above, the invention makes it possible to realize a feature extracting method which can extract a feature amount for accurate recognition for radiation images, a radiography object recognizing method and an image processing apparatus.

III. Feature Amount Right or Wrong Judgment

A feature amount obtained by contour feature amount extracting means 40 and a feature amount obtained by edge feature amount extracting means 50 are combined mutually in right or wrong judging means 60 to be judged whether they are right or wrong. Only feature amounts judged to be right are outputted to radiography object recognizing means 70 to be used for judgment of radiographing body parts.

As shown in FIG. 13, the right or wrong judging means 60 is composed of combination judging means 61, combination storing means 62 and feature amount eliminating means 63, which will be explained in succession.

(6-1) Combination Judgment and Combination Storage:

The combination judging means 61 transmits the form vector S and edge pattern vector E to the combination storing means 62. In the combination storing means 62, a combination of nonzero elements of each vector transmitted is compared with a combination of storage to be eliminated whether they are the same or not. If they are the same, existence of the same combinations is shown to the combination judging means 61, and signals showing the feature amount to be eliminated are returned. When the same combinations are not present, signals showing to that effect are returned.

If the signals showing that the same combinations are not present are transmitted, all feature amounts are judged to be right, and all feature amounts are transmitted to radiography object recognizing means 70.

On the contrary, when signals showing that the same combinations are present are transmitted, all feature amounts are transmitted to the feature amount eliminating means 63 together with the signals showing the feature amounts to be eliminated.

(6-2) Eliminating Feature Amounts:

In the feature amount eliminating means 63, feature amounts are selected and eliminated based on the signals showing feature amounts to be eliminated. With regard to the feature amounts to be eliminated stored in the combination storing means 62 in advance, these are determined experientially for example. For instance, when the results of judgment for a feature amount by a contour to be "barrel type" (indicating head) are highly reliable, if "a long bone" is extracted as a feature amount caused by signal variance, this feature amount of "a long bone" is judged to be wrong.

(6-3) Judgment of Right or Wrong and Others:

By judging right or wrong of features by combinations of plural feature amounts in the way above, radiographing body parts or directions can be recognized accurately.

Incidentally, though there has been explained about right or wrong judgment by combinations of a contour of a radiography object and edge patterns in the present embodiment, judgment for right or wrong by combinations of different features is not limited to the foregoing.

For example, a combination of a density feature amount obtained by examining density distribution such as image profile and histogram described in TOKKAIHEI Nos. 4-141153 AND 11-85950 and the contour and a combination of the density feature amount and the edge pattern are considered, and further, it is considered to combine a size of an object region (indicated with the number of pixels that is represented by '1' in terms of the region indicating image, for example) representing a feature amount with the contour, or with an edge pattern, or with a density feature amount.

For example, in the case of a density feature amount, when a region having higher density than that of a peripheral portion of the object region is detected near the center of the radiography object, a feature amount showing existence of a lung field is obtained, and when a feature amount of "boomerang type" wherein only limbs are considered in a contour is obtained, a size of the object region shows a finger and an edge pattern by signal variance shows "spine", which means that a feature amount on one side is made to be wrong.

(7) After Judgment of Right or Wrong:

In the case of images for diagnoses, image processing to be conducted to obtain images suitable for diagnoses varies, in many cases, depending on body parts of a radiography object and directions for radiographing. Therefore, a plurality of image processing conditions are prepared in advance and are stored in image processing condition storing means 90. In radiography object recognizing means 70, body parts of a radiography object and radiographing orientations are recognized based on a feature amount transmitted from the right or wrong judging means 60. The results of the recognition are sent to image processing condition selecting means 80. The image processing condition selecting means 80 selects optimum image processing conditions from the image processing condition storing means 90, based on the results of the recognition. The image processing conditions thus selected are sent to image processing means 100. In the image processing means 100, an original image sent from radiation image forming means 10 is subjected to image processing under the aforesaid image processing conditions. The processed image which has been subjected to image processing is outputted to a monitor or a printer to be used for diagnoses.

As stated above, the invention makes it possible to realize a feature amount right or wrong judging method for judging right or wrong to eliminate wrong feature amount and for recognizing accurately the radiographed body parts of a radiography object and radiographing orientations by obtaining plural feature amounts and combining them, for radiation images.

IV. Radiographing Orientation Judgment

As shown in FIG. 14, a contour obtained by contour feature amount extracting means 40 and signal variance information obtained by a signal variance extracting means are used for judging the radiographing orientation for the radiography object, in radiographing orientation judging means 60.

In the present example, there will be explained an occasion wherein a radiographing orientation is judged with regard to either contour information or signal variance information, and a radiography object is judged to be radiographed in the direction from side to side of the radiography object, if the radiographing orientation is judged to be the direction from side to side of the radiography object.

In this case, when judging based on respective information, a threshold value is adjusted in advance so that the direction may be judged to be the direction from side to side only when the direction from side to side is highly reliable. It is further possible to employ a method wherein criteria to judge a direction to be the direction from side to side in a stage for judging based on only both information is relaxed by adjusting the threshold value, and the direction is finally judged to be the direction from side to side only when the direction is judged to be the direction from side to side by both information.

A human body is structured to be symmetrical laterally when it is viewed front ways. Therefore, when judging whether a radiography object was radiographed front ways or radiographed in the direction from side to side, the radiography object has only to be checked whether it is mostly symmetrical about an axis that is in parallel with a body axis (a direction from a parietal body part toward a coccyx, or a longitudinal direction of a bone in the case of a limb) and passes through the center of the radiography object. If the radiography object is almost in axial symmetry, the radiography object is judged to be radiographed front ways, and if not, the radiography object is judged to be radiographed in the direction from side to side.

First, judgment is made whether the radiography object is symmetrical laterally (vertically) or not based on contour information, and if the radiography object is judged to be asymmetrical from the judgment, processing in the present means is terminated, and results of judgment that the radiography object was radiographed in the direction from side to side are outputted.

If not in the foregoing, judgment is made next whether the signal variance between neighboring pixels obtained by the signal variance extracting means is symmetrical or not based on distribution of large pixels, and if the radiography object is judged to be asymmetrical based on the judgment, the radiography object is judged to be radiographed in the direction from side to side.

When the radiography object is not judged to be asymmetrical in the both cases above, the radiography object is judged to be radiographed front ways. Then, processing in the present means is terminated, and results of judgment are outputted. Explanations will be given in succession as follows.

(7-1) Determination of Body Axis Direction

A length of an object region is obtained for each of the horizontal direction and the vertical direction of an image, and the direction wherein the total length of the region is longer is determined to be the body axis direction. If a direction is determined by another information (vertical direction of a detector) in advance, the direction is made to be the body axis direction.

(7-2) Judgment of Direction Based on Contour

Information of a contour that is in parallel with the body axis direction (information from boundary between right and left regions in the object region, if the body axis direction is perpendicular to the image) is first selected. Though the body axis direction is assumed to be perpendicular to the image in the following explanation, even when the body axis direction is in parallel with the image, the processing can be conducted in the same way only through vertical and lateral changing.

A polar point where the depth of a concave and convex level is greatest is selected with respect to the right and left of the object region. By comparing a concave and convex direction, a position of vertical coordinates, a depth and a width between polar points selected respectively from the right and left, judgment is made to find symmetry or not. If it is judged to be asymmetrical in any of the foregoing, the radiography object is judged to be radiographed in the direction from side to side.

i) When Comparing Concave and Convex Directions

If concave and convex directions are opposite on the right and left (for example, left is convex and right is concave), and a depth of the polar point is greater than threshold value Sthd1 for both polar points, this is judged to be asymmetrical. In this case, it is preferable that the threshold value Sthd1 is 10-30% of a mean width of a radiography object (a mean value of the longest distances each being between region boundary points on the same scanning line in the lateral direction of the image). When the threshold value Sthd1 is smaller than this, a delicate change on a body lateral line of a radiography object is sensed to prevent correct judgment, while, when the threshold value Sthd1 is greater than this, even a curved portion on a joint, for example, cannot be detected correctly.

ii) When Comparing Positions on Vertical Coordinates

Even when the concave and convex levels of polar points for the right and left are the same, if a difference of vertical coordinates is not less than prescribed threshold value Sthd2, this is judged to be asymmetrical.

In this case, it is preferable that the threshold value Sthd2 is 5-20% of a length of an object region in the vertical direction. When the threshold value Sthd2 is smaller than this, a radiography object is judged to be asymmetrical simply because the radiography object is slightly inclined against the image, although the radiography object is radiographed front ways. When the threshold value Sthd2 is greater than this, asymmetry of the radiography object cannot be detected.

iii) When Comparing Depth and Width

Even when the concave and convex levels of polar points for the right and left are the same and vertical coordinates are present at positions which are mostly the same, if the depth and the width of the polar point are greatly different, this is judged to be asymmetrical.

For example, when a radiography object is a cervix which is radiographed in the direction from side to side, if a jaw is lifted slightly for radiographing, a contour turns out to be concave at a cervix both on the front side and the rear side of the body. However, from the viewpoint of the human body structure, the front side of the body shows a sharp concave form wherein a width is small and a depth is great, while, the rear side thereof shows a gentle concave form wherein a width is great. Therefore, when an absolute value of a difference of the depth between both polar points at right and left is not less than prescribed threshold value Sthd 3, or when a difference of the width between both polar points at right and left is not less than prescribed threshold value Sthd 4, this is judged to be asymmetrical. In this case, it is preferable that the threshold value Sthd 3 is 3-15% of a mean width of the radiography object. When the threshold value Sthd 3 is smaller than this, a difference between the right and left that is generated even when a radiography object is radiographed front ways is detected, resulting in a high possibility of erroneous judgment for asymmetry. When the threshold value Sthd 3 is greater than this, on the other hand, a difference which should be detected naturally cannot be detected.

Equally, it is preferable that threshold value Sthd4 is 3-15% of a length of the radiography object in the vertical direction. Even when the threshold value Sthd4 is not within this range, troubles similar to those in the case of the threshold value Sthd3 are caused.

(7-3) Judgment of Radiographing Orientation Based on Signal Variance

Signal variance information based on a signal variance between neighboring pixels indicates information based on the internal structure of a radiography object. As stated earlier, a signal variance between neighboring pixels is especially great on an edge of a bone and on a contour of a lung field. Signal variance information showing distribution of pixels where a signal variance between neighboring pixels is great obtained by the edge feature amount extracting means 50 mainly indicates edges of bones. It is therefore possible to judge the radiographing orientation for a radiography object by examining symmetry property of the pixel distribution.

The symmetry property of the pixel distribution is judged by the following i)- iv) means.

i) There is established small region rij obtained by dividing an object region equally in the body axis direction into m parts (m is about 3-10) and by dividing equally in the direction perpendicular to the body axis direction into three parts. In this case, each of i and j is an index showing the position of the small region, and i is an index in the direction perpendicular to the body axis and it takes $-1$, 0 and 1, while, j is an index in the direction that is in parallel with the body axis and it takes 1, 2, . . . , and m (see FIG. 15).

ii) The number of pixels each having edge selection information Lx,y>0 included in each small region is counted, and the number nijk (i=$-1$, 0, 1, j=1, 2, . . . , k=1, 2), and the center of gravity gijkl (i=$-1$, 0, 1, j=1, 2, . . . , m, k=1, 2, l=1, 2) are obtained.

In this case, each of i and j is an index showing the position of the small region, k represents an index showing the edge direction (the body axis direction for 0 and the direction perpendicular to the body axis for 1), and l represents an index showing coordinates in the horizontal direction and vertical direction, or dispersion of coordinates (the body axis direction for 0 and the direction perpendicular to the body axis for 1).

iii) Since it is considered that a structure (a bone or the like) useful for judging symmetry property of a radiography object exists in a portion where edges are concentrated, symmetry property about the body axis direction is examined, focusing on the small region having therein many edges.

First, the small region rxy having the largest number nijk of edges is detected.

Let it be assumed that nxyk is zero when x is zero.

When x is $-1$ or 1, in small regions r$-$xy+a(a=$-1$,0,1) each being positioned to be almost symmetric with the small region having that value of x about the body axis, the number of edges in the same direction as the edge direction in which the number of edges is greatest is examined, then, the number and the center of gravity are compared with rxy about small region r-xz having the greatest number, and when the following conditions are satisfied by at least one of them, a judgment is made to be asymmetry.

When the number of edges (r$-$xzk/nxyk)<Thdn is satisfied, a judgment is made to be asymmetry. Thdn of 0.3-0.6 is preferable.

When the position of center of gravity of edges |gxyk0$-$g-xzk0| is satisfied, a judgment is made to be asymmetry. Thdg represented by 5-20% of a length in the body axis direction of a radiography object is preferable.

When the aforesaid conditions are not satisfied, nxyk and n-xzk are made to be zero.

iv) When no judgment is made to be asymmetry, operations in iii) are repeated for the prescribed number of times, or repeated until the maximum value of the number of edges comes to be less than the prescribed number. When no judgment is made to be asymmetry even after repeating for the prescribed number of times, the radiography object is judged to be symmetric.

In the case of images for diagnoses, there are many cases where image processing to be conducted to obtain images suitable for diagnoses when a radiography object is radiographed front ways is different from that when a radiography object is radiographed in the direction from side to side of the radiography object.

Accordingly, a plurality of image processing conditions are prepared in advance to be stored in image processing condition storing means 80. Then, the results of judgment obtained from the direction judging means 60 stated earlier are sent to image processing condition selecting means 70. The image processing condition selecting means 70 selects optimum image processing conditions from the image processing condition storing means 80 based on the aforesaid results of judgment. The image processing conditions thus selected are sent to image processing means 90. In the image processing means 90, an original image sent from radiation image forming means 10 is subjected to image processing under the image processing conditions mentioned above. The processed image which has been subjected to the image processing is outputted to a monitor or a printer to be used for diagnoses.

As explained above, in the invention, when judging the direction for radiographing an object in radiography, it is possible to use either one of symmetry property of a contour of an object region and symmetry property of a local signal variance included in the object region, or to use a combination of both of them after extracting the object region, which makes it possible to judge the radiographing orientation for the radiography object accurately.

What is claimed is:

1. A radiation image processing apparatus for conducting an image processing for radiation image data of a radiographed body part, the apparatus comprising:

an object region extracting section that receives a set of two-dimensionally-arranged radiation image data including the radiation image data of the radiographed body part and extracts an object region formed by the radiation image data of the radiographed body part from the set of two-dimensionally-arranged radiation image data;

a contour recognizing section having contour type classification criteria data for each of a plurality of predetermined-different contour types including a square type, a rectangular type and a barrel type in correspondence to a plurality of different kinds of body parts including a chest, an abdomen and a leg, wherein the contour recognizing section recognizes a contour of the extracted object region, and determines to which one of the plurality of different contour types the recognized contour belongs based on the data of contour type classification criteria, and an image processing section having a plurality of different image processing conditions, which selects one of the plurality of different image processing conditions in accordance with the determined one of the plurality of different contour types and conducts the image processing for the radiation image data of the radiographed body part based on the selected one of the plurality of different image processing conditions.

2. The radiation image processing apparatus according to claim 1, wherein the contour recognizing section judges the kind of recognized contour based on a position change of a boundary of the object region.

3. The radiation image processing apparatus according to claim 2, wherein the contour recognizing section comprises:

a region boundary point detecting section that detects a boundary of the object region, a position change amount calculating section that calculates a position change amount of the boundary of the object region from plural region boundary points detected by the region boundary point detecting section, and a contour specifying section that specifies the kind of recognized contour from the position change amount calculated by the position change amount calculating section.

4. The radiation image processing apparatus according to claim 3, wherein the position change amount is a distance between neighboring region boundary points.

5. The radiation image processing apparatus according to claim 3, wherein the position change amount is an amount of change in coordinates between neighboring region boundary points in one or both of the horizontal and vertical directions.

6. The radiation image processing apparatus according to claim 1, wherein the contour recognizing section judges the kind of recognized contour based on local region widths of the object region.

7. The radiation image processing apparatus according to claim 6, wherein the contour recognizing section comprises:

a region boundary point detecting section which detects a boundary of the object region, a region width calculating section which calculates local region widths of the object region from plural region boundary points detected by the region boundary point detecting section, and a contour specifying section which specifies the kind of recognized contour from the region widths calculated by the region width calculating section.

8. The radiation image processing apparatus according to claim 1, wherein the body part of the object is recognized by using the feature amount obtained in the contour recognizing section.

9. The radiation image processing apparatus according to claim 1, further comprising a radiographing orientation judging section which judges a radiographing orientation for the object from the contour based on the feature amount.

10. The radiation image processing apparatus of claim 1, wherein the contour recognizing section provides a feature amount to the recognized contour in accordance with the determined one of the plurality of different contour types.

11. The radiation image processing apparatus of claim 1, further comprising:

a control section to control the object region extracting section, the contour recognizing section and the image processing section so as to conduct the gradation conversion process automatically.

* * * * *